US011752547B2

(12) United States Patent
Mathisen et al.

(10) Patent No.: US 11,752,547 B2
(45) Date of Patent: Sep. 12, 2023

(54) SOLIDIFICATION REFINEMENT AND GENERAL PHASE TRANSFORMATION CONTROL THROUGH APPLICATION OF IN SITU GAS JET IMPINGEMENT IN METAL ADDITIVE MANUFACTURING

(71) Applicant: NORSK TITANIUM AS, Hønefoss (NO)

(72) Inventors: Martin Borlaug Mathisen, Hønefoss (NO); Hilde Løken Larsen, Oslo (NO)

(73) Assignee: Norsk Titanium AS, Honefoss (NO)

(*) Notice: Subject to any disclaimer, the term of this patent is extended or adjusted under 35 U.S.C. 154(b) by 733 days.

(21) Appl. No.: 16/024,275

(22) Filed: Jun. 29, 2018

(65) Prior Publication Data

US 2019/0001437 A1 Jan. 3, 2019

Related U.S. Application Data

(63) Continuation-in-part of application No. 16/019,460, filed on Jun. 26, 2018, now abandoned.
(Continued)

(51) Int. Cl.
*B22D 23/00* (2006.01)
*B23K 26/14* (2014.01)
(Continued)

(52) U.S. Cl.
CPC .......... *B22D 23/003* (2013.01); *B22F 3/1028* (2013.01); *B23K 10/027* (2013.01);
(Continued)

(58) Field of Classification Search
CPC ............ B23K 26/1464; B23K 26/1438; B23K 26/342; B23K 26/348; B23K 26/60;
(Continued)

(56) References Cited

U.S. PATENT DOCUMENTS

2006/0054079 A1* 3/2006 Withey .............. B23K 35/0244
117/108
2014/0015172 A1* 1/2014 Sidhu ...................... B22F 10/20
264/497
(Continued)

FOREIGN PATENT DOCUMENTS

CN    103639412 A    3/2014
CN    103878370 A    6/2014
(Continued)

OTHER PUBLICATIONS

International Search Report and the Written Opinion of PCT/EP2018/067608, dated Jan. 18, 2019.
(Continued)

*Primary Examiner* — Dana Ross
*Assistant Examiner* — Joseph W Iskra
(74) *Attorney, Agent, or Firm* — Lee & Hayes, P.C.

(57) ABSTRACT

Provided are a jet device and systems and methods using the jet device for manufacturing objects by additive manufacturing, especially titanium and titanium alloy objects, wherein the jet device directs a cooling gas across a liquid molten pool, or to impinge on the liquid molten pool, or to impinge upon a solidified material adjacent to a liquid-solid boundary of the liquid molten pool, or to impinge on an as-solidified material, or any combination thereof, during the additive manufacturing process. The application of the cooling gas can result in an additively manufactured metal product having refined grain structure with a high proportion of the grains being approximately equiaxed, and can yield an additively manufactured product exhibiting improvements in strength, fatigue resistance, and durability.

2 Claims, 10 Drawing Sheets

Related U.S. Application Data

(60) Provisional application No. 62/527,656, filed on Jun. 30, 2017.

(51) Int. Cl.

| | | |
|---|---|---|
| *B23K 26/342* | (2014.01) | |
| *B23K 37/06* | (2006.01) | |
| *B23K 10/02* | (2006.01) | |
| *B22F 3/10* | (2006.01) | |
| *B33Y 10/00* | (2015.01) | |
| *B33Y 30/00* | (2015.01) | |
| *B23K 26/00* | (2014.01) | |
| *B23K 26/60* | (2014.01) | |
| *B23K 26/348* | (2014.01) | |
| *B33Y 50/02* | (2015.01) | |
| *B23K 103/14* | (2006.01) | |

(52) U.S. Cl.
CPC ........ *B23K 26/0006* (2013.01); *B23K 26/147* (2013.01); *B23K 26/1438* (2015.10); *B23K 26/1464* (2013.01); *B23K 26/342* (2015.10); *B23K 26/348* (2015.10); *B23K 26/60* (2015.10); *B23K 37/06* (2013.01); *B33Y 10/00* (2014.12); *B33Y 30/00* (2014.12); *B33Y 50/02* (2014.12); *B22F 2301/205* (2013.01); *B22F 2998/10* (2013.01); *B23K 2103/14* (2018.08)

(58) Field of Classification Search
CPC .............. B23K 10/027; B23K 26/0006; B23K 26/147; B23K 37/06; B23K 2103/14; B23K 9/173; B23K 9/164; B23K 9/325; B23K 26/032; B23K 26/702; B23K 9/04; B23K 26/703; B23K 35/0244; B33Y 10/00; B33Y 30/00; B33Y 50/02; B33Y 40/00; B22F 12/00; B22F 3/1028; B22F 10/10; B22F 2301/205; B22F 2998/10; B22F 2009/088; B22F 2009/0892; B22F 12/53; B22F 10/20; B22F 10/30; B22D 23/003; B22D 11/0642; B22D 41/50; B22D 11/124; B22D 11/1246; B22D 17/2023; C21D 1/62; B29C 64/106; B29C 67/0088; B29C 64/393; B29C 64/118; B29C 64/153; F01D 5/34; F01D 5/005; B23P 6/007; C30B 29/52; C30B 13/24; C30B 29/02; C30B 7/08; C30B 9/04; C30B 11/003; Y02P 10/25
USPC .................................................... 219/121.16
See application file for complete search history.

(56) References Cited

U.S. PATENT DOCUMENTS

| | | | |
|---|---|---|---|
| 2015/0108094 A1* | 4/2015 | Siewert | B23K 9/325 |
| | | | 219/74 |
| 2016/0067920 A1 | 3/2016 | Fontaine | |
| 2017/0120398 A1* | 5/2017 | Veldsman | B23K 37/003 |

FOREIGN PATENT DOCUMENTS

| | | | | |
|---|---|---|---|---|
| CN | 104694921 A | | 6/2015 | |
| CN | 105414746 A | * | 3/2016 | |
| CN | 105855549 | | 8/2016 | |
| DE | 102015117238 | | 4/2017 | |
| EP | 1637274 | | 3/2006 | |
| EP | 2502729 | | 9/2012 | |
| EP | 2502729 A1 | * | 9/2012 | ............. B22F 10/10 |
| EP | 2969383 | | 1/2016 | |
| WO | WO2014143310 A1 | | 9/2014 | |

OTHER PUBLICATIONS

International Preliminary Report of Patentability of PCT/EP2018/067608, dated Aug. 30, 2019.
Jia et al., "Microstructures and Mechanical Properties of Laser Rapid Formed Ti—6Al—4V Alloy," Proc. of SPIE 5629: 119-128 (2005).
Eurasian Office Action dated Oct. 22, 2021 for Eurasian Patent Application No. 202090123, a foreign counterpart to U.S. Appl. No. 16/019,460, 9 pages.
Chinese Office Action dated Feb. 9, 2022 for Chinese Patent Application No. 201880056639.8, a foreign counterpart to U.S. Appl. No. 16/019,460, 22 pages.
European Office Action dated Mar. 7, 2022 for European Patent Application No. 18735566.4, a foreign counterpart to U.S. Appl. No. 16/019,460, 8 pages.
Chinese Office Action dated Aug. 4, 2021 for Chinese Patent Application No. 201880056639.8, a foreign counterpart to U.S. Appl. No. 16/019,460, 16 pages.
Eurasian Office Action dated Jun. 6, 2022 for Eurasian Patent Application No. 202090123, a foreign counterpart to U.S. Appl. No. 16/019,460, 4 pages.
Korean Office Action dated May 27, 2022 for Chinese Patent Application No. 10-2020-7002627, a foreign counterpart to U.S. Appl. No. 16/019,460, 43 pages (with machine generated English translation).

* cited by examiner

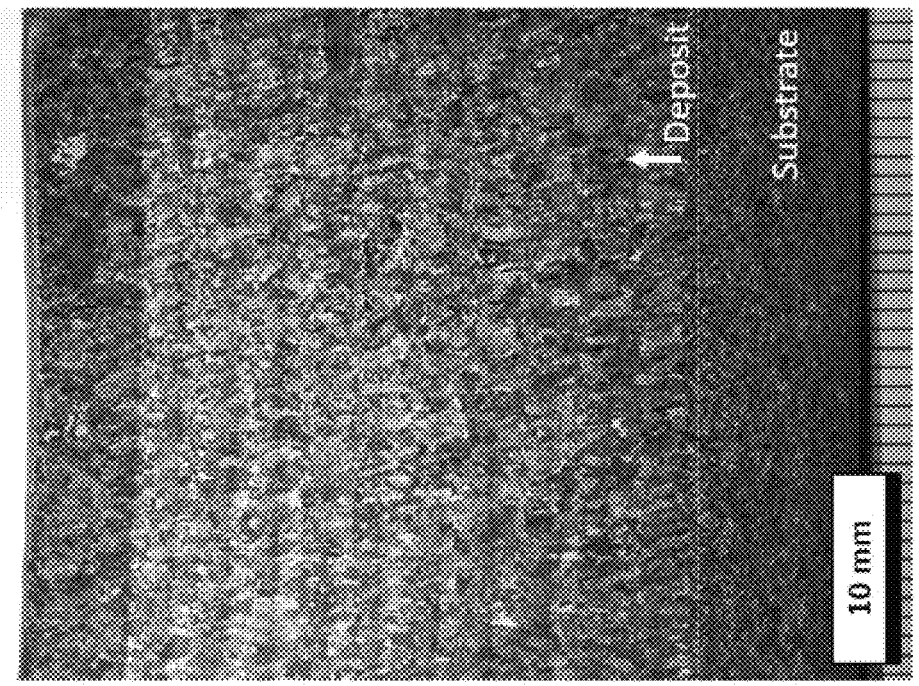
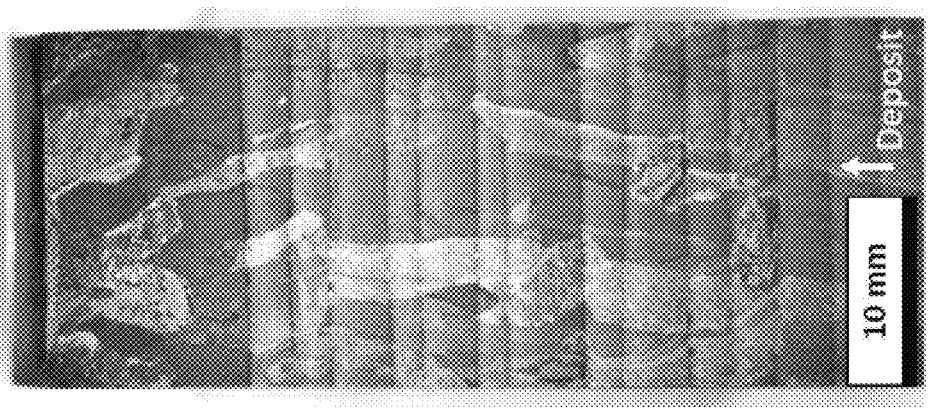
FIG. 5B
FIG. 5A

SOLIDIFICATION REFINEMENT AND GENERAL PHASE TRANSFORMATION CONTROL THROUGH APPLICATION OF IN SITU GAS JET IMPINGEMENT IN METAL ADDITIVE MANUFACTURING

RELATED APPLICATIONS

Benefit of priority is claimed to U.S. patent application Ser. No. 16/019,460, titled "SOLIDIFICATION REFINEMENT AND GENERAL PHASE TRANSFORMATION CONTROL THROUGH APPLICATION OF IN SITU GAS JET IMPINGEMENT IN METAL ADDITIVE MANUFACTURING," filed Jun. 26, 2018, and to U.S. Provisional Application No. 62/527,656, titled "REFINEMENT OF SOLIDIFICATION STRUCTURES IN ADDITIVE MANUFACTURING BY MELT POOL GAS JET IMPINGEMENT," filed Jun. 30, 2017, the disclosure of each of which is incorporated by reference herein in its entirety.

BACKGROUND OF THE INVENTION

Field of the Invention

The present invention relates to devices and methods for manufacturing objects by solid freeform fabrication, especially titanium and titanium alloy objects.

Discussion of the Related Art

Structured metal parts made of titanium or titanium alloys, or other metal alloys, are conventionally made by casting, forging or machining from a billet. These techniques have a number of disadvantages, such as high material use of the expensive titanium metal and large lead times in the fabrication of the metal object. Casting, which often can be used for production of a potentially near-net-shape object, typically has a reduced material quality due to lack of control of solidification and cooling rates. Tooling costs and the inability to prepare objects with complex shapes are additional disadvantages of the conventional methods.

Fully dense physical objects can be made by a manufacturing technology known as rapid prototyping, rapid manufacturing, layered manufacturing or additive manufacturing. Additive manufacturing offers great fabrication freedom and potential cost-savings due to the layered build-up of near-net-shape products. It is desirable to match the material properties of conventional thermo-mechanical processing methods such as forging while utilizing the same established metal alloys.

In thermo-mechanical processing, the material properties are in most cases a result of the refined grain structures achieved by recrystallization induced by the plastic deformation of the mechanical forming steps. This mechanism is not available in a typical additive manufacturing process, where molten material is added in layers, solidifies and cools down without any mechanical forming. This typically results in coarse as-solidified grain structures. In many alloys the resulting structures will also be elongated with a high aspect ratio. This is due to the directional heat extraction provided by the relatively colder workpiece as superheated molten metal is added. Solidification initiates from the previously deposited layer(s), and propagates up into the deposited material as it cools down. The solidification structures will in many cases extend across several layers, up to several centimeters in size. These characteristics are typically not optimal to mechanical properties, giving rise to reduced and/or anisotropic strength, elongation and fatigue performance. Upon further cooling after solidification, allotropic phase transformations (transformation from one crystal structure to another), precipitation and other solid state thermochemical reactions occur. The nature of these depend on the alloy system in question. Of primary concern is the cooling rate in key temperature ranges where these transformations happen. The layered additive manufacturing process generates complex cyclic heating, cooling and reheating conditions where control over all relevant phase transformations in every deposited layer is crucial to achieve a consistent product. Achieving thermal control despite changing workpiece geometry, heat sink properties and accumulated heat is therefore a challenge faced in additive manufacturing. In addition to the effect of the cooling rate on the just deposited and solidified area, the cooling applied post deposition also contributes to the overall cooling of the work piece, allowing start of deposition of a new string or layer to occur without any significant waiting time. This is especially beneficial for compact geometries with less cycle time between strings or layers. In situ gas jet impingement in targeted phase transformation regions can increase cooling rate and result in solidification refinement and general phase transformation modulation and/or control.

Prior techniques include, for example, utilization of a hybrid process where each deposited layer is plastically deformed to achieve a recrystallized grain structure has been applied to reduce distortion and improve mechanical properties (see U.S. Pat. Ap. Pub. No. US2015/0360289, Liou et al. (2015)). Such intermediate forming steps, however, give a reduced effective deposition rate (negatively impacting productivity), and can limit the freedom of fabrication in terms of the ability to form complex shapes. Other techniques include inter-layer laser peening and ultrasonic impact treatment, such as described in International Pat. Appl. WO 2013140147 A1 (Wescott et al. (2013)) and inter-layer cold rolling, such as described in European Pat. App. Pub. EP2962788 A1 (Liou et al. (2016)).

Forced cooling has been applied on the as-solidified layer during cooling of the solidified metal in preparation for laser or ultrasonic impact treatment to reduce thermal distortion and refine grain structures as a result of recrystallization (see U.S. Pat. App. Pub. No. US2015/0041025, Wescott et al. (2015)). This helps reduce waiting times between layers, but still requires waiting for the right workpiece temperature followed by conditioning of the as-deposited layer which will negatively affect productivity and potentially limit fabrication freedom. None of the prior art mentions applying any cooling during deposition, and definitely not applying cooling on a melt pool or to an area adjacent to a melt pool during deposition (in situ). Instead, Wescott et al. describes cooling the as-solidified layer of a string of a workpiece in-between string depositions in order to prepare for the deformation step. For the methods that physically work the deposited layer, contaminations from tooling also will be a concern since any contaminations can get enclosed between layers of the final product in an additive process. Wescott et al. does not mention refinement of solidification structures in additive manufacturing by melt pool gas jet impingement.

Other techniques that have been used to refine metals to achieve grain refinements include transmission of high frequency vibrations to a body of molten material, such as through application of mechanical vibrations (e.g., see U.S. Pat. No. 3,363,668, Petit et al. (1968)), acoustic energy (U.S. Pat. App. Pub. No. 2014/0255620, Shuck et al. (2014)), or an oscillating electromagnetic field (International Pat. App.

WO2015028065 A1, Jarvis et al. (2015)). In addition to potentially prohibitive costs and lack of practical methods of implementation, the effectiveness of the general principle of melt pool agitation is very limited on many of the relevant metal alloys. Specifically, it requires a zone of partially solidified material at the propagating solidification front to be able to disrupt that front through fragmentation. The nature of many alloys applicable to additive manufacturing, such as many of the titanium alloys, and particularly the major titanium alloy Ti-6Al-4V, is a narrow freezing range which makes it very resistant to fragmentation of the solidification front through the techniques that utilize a vibration mechanism, such as an acoustic, electromagnetic or a mechanical vibration mechanism.

Accordingly, there exists a need in this art for an economical method of performing metal additive manufacturing at an increased rate of metal deposition in an additive manufacturing system that yields metal products having a finer grain structure, particularly having more equiaxed grains, and a more consistent microstructure after additional cooling below any relevant phase transformation temperatures, compared to what is achieved in traditional additive manufacturing processes.

SUMMARY OF THE INVENTION

Accordingly, the present invention is directed to refinement of solidification structures in additive manufacturing by melt pool gas jet impingement that substantially obviates one or more of the problems due to limitations and disadvantages of the related art. An extension of the device, or a separate gas jet device can be used to achieve further in-situ thermal control of the as-deposited and solidified material. Provided are devices, systems and methods to refine the solidification structures and control microstructures during metal additive manufacturing to achieve products with improved material quality, particularly having more equiaxed as-solidified grain structure. Manufactured products having these refined grain structures demonstrate increased strength, fatigue resistance, and ductility. There further exists a need in this art for a method of increasing throughput and yield of metal products produced by metal additive manufacturing methods.

An advantage of the present invention is to provide grain refinement in metal articles produced by additive manufacturing, wherein the resulting grain structure has comparable aspect ratio and homogeneity to that typically present in mechanically worked metals and a significantly reduced average grain size compared to typical cast or additively manufactured materials.

The devices and methods provided herein result in solidification structure refinement and microstructural control through gas jet impingement on the free surface of the melt pool, or the boundary between liquid and solid, or on the solidified metal in the vicinity of the liquid-solid boundary, or on the solidified metal, or any combination thereof, during formation of a layered metal deposit using additive manufacturing. The gas used can be inert or non-inert, elemental or mixed, depending on whether the metal alloy in question is sensitive to atmospheric contaminations.

Grading of microstructures and optimization of material properties in different sections of a deposit also are made possible with the use of the devices and methods provided herein in additive manufacturing. The devices and methods provide a practical way to achieve significant refinement of metal structure, resulting in grains that in most cases will be somewhat coarser than typical mechanically worked metals, but of comparable aspect ratio and homogeneity. Directed cooling gas jets at the liquid surface and liquid-solid boundary of the melt pool can induce and accelerate opposing solidification front at the free melt pool surface. Blocking of epitaxy can be achieved as consecutive layers nucleate and solidify from the top-layer grains. Forced cooling through concentrated turbulent gas flow provided by the devices provided herein when applied on the as-solidified material can enhance, modulate or control solid-state phase transformation.

Another advantage of the present invention is that the device and methods allow manipulation of solidification conditions and significant refinement potential in many metal alloys without requiring time consuming conditioning between layers, limitations on shape processing, or significant reductions in deposition rate or deposition productivity. Use of the cooling jet device to force cool the deposited material during additive manufacturing by in situ application of jets of cooling gas at targeted areas, alone or in combination with a cooling jet device directed to the melt pool, can significantly increase deposition productivity. High cooling gas flows from the jet device directed to the as-deposited material can significantly remove thermal energy, resulting in improved bulk cooling rate of the deposited material. The cooling jet devices provided herein can be configured to work with most melting tools, and can be adjusted, activated or deactivated at any time while deposition is taking place in an additive manufacturing process. This flexibility provides the ability to modify the underlying grain structure of the manufactured product during the manufacturing process. The methods can be used with any metal additive manufacturing process, including plasma and wire-based processes, and laser system, and is particularly suitable to high deposition rate processes. While Ti and Ti alloy workpiece product are mentioned as examples throughout, the methods likely are equally suitable to many other alloy systems based on metallurgical theory. For example, Inconel superalloys also are predisposed to achieving the refinement effect achieved using the devices, methods and systems provided herein.

The jet gas flow from the jet device provided herein directed at the melt pool, such as the melt pool free surface, can increase crystallographic diversity, and the extent of grain boundary alignment can be reduced. The directed jetted gas can yield a more homogeneous and finely distributed presence of different microstructural elements. Typically additively manufactured metal products can include the presence of columnar solidification structures extending several centimeters across the deposit layers. They can be broken up by finer grains at irregular intervals due to minor fluctuations in thermal gradients and melt pool convection etc. The jet tool provided herein when directed at the melt pool can induce or promote nucleation at the melt pool free surface, along with a reduced temperature gradient, can result in break-up of the columnar structures traditionally present in additively manufactured materials and yield improved repeatable material properties.

Another advantage of the present invention is that the devices and methods allow for modulation of cooling rates during the additive manufacturing process. In additive manufacturing, multiple elements most commonly referred to as strings, beads, or tracks, typically can be stitched and stacked to form what is quite often very complex shapes. The strings are formed by feeding metal material, typically in wire or powder form, into a travelling heat source, where the metal material is melted and fused by the supplied energy of the heat source. The heat source can be a high-energy laser beam, electron beam or plasma arc, or any combination thereof. This layered deposition can generate complex, cyclic and transient thermal conditions. Cyclic, because previously deposited material typically is reheated by deposition of consecutive layers, and transient due to change of boundary conditions like heat sink characteristics as the build progresses.

Most metal alloys are sensitive to their thermal history. Typically, the cooling rates from the high temperatures of string deposition to the bulk workpiece temperature have a profound effect on the final material properties. In addition, the effects of heat input from consecutive layers can alter material characteristics through in-process annealing and aging effects. It is therefore critical to control the local thermal conditions to produce consistent material properties throughout a complex additively manufactured product. The invention disclosed herein relates to devices, systems and methods that improve the capability to modulate or control thermal conditions in additive manufacturing by application of in-process temperature measurement and application of forced convective cooling using the jet devices provided herein.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, provided are jet devices, that include a first conduit including an inlet for accepting a cooling gas and an aperture connected to a nozzle for dispensing a cooling gas; a second conduit including an inlet for accepting a cooling gas and an aperture connected to a nozzle for dispensing a cooling gas; where the first conduit is attached to a melting tool producing a thermal energy source on one side of the thermal energy source and the second conduit is attached to the melting tool on an opposite second side of the thermal energy source; at least one nozzle is configured to produce a turbulent flow of the cooling gas as the cooling gas exits the nozzle; and the nozzles are configured and positioned to prevent blowing the cooling gas toward the thermal energy source.

Also provided are jet devices that include at least one conduit that includes an inlet for accepting a cooling gas and one or more apertures each of which is connected to one or a plurality of nozzles for dispensing a cooling gas in situ to an as-deposited material. The jet device can be configured to include a plurality of conduits each of which includes an inlet for accepting a cooling gas. The conduits can be configured to deliver jets of cooling gas in situ to one surface or multiple surfaces of the as-deposited material. As an example, a single conduit can be configured to include a plurality of nozzles, where some nozzles can be configured to direct cooling gas jets to one side surface of the as-deposited material, other nozzles can be configured to direct cooling gas jets to the other side surface of the as-deposited material, and other nozzles can be configured to direct cooling gas jets to the upper surface of the as-deposited material. As another example, the jet device can include multiple conduits, where one conduit can be configured to include nozzles that direct cooling gas jets to one side surface of the as-deposited material, a second conduit can be configured to include nozzles that direct cooling gas jets to the other side surface of the as-deposited material, and a third conduit can be configured to include nozzles that direct cooling gas jets to the upper surface of the as-deposited material. The jet device can be connected to a portion of the system at a location that allows the nozzles to be directed to a surface of solidified as-deposited material. In some configurations, the jet device can be connected to a wire or powder feed device. The jet device can be connected to a bracket or support and be independent from a wire or powder feed device.

The systems provided herein can include a jet device that directs cooling gas jets to an as-deposited material in situ and at least two temperature sensors to monitor temperature in the region of application of the cooling gas jets during the additive manufacturing process. A first temperature sensor can monitor the temperature at the surface of the as-deposited material ahead of the application of a cooling gas, and a second temperature sensor located after the jet device can be included to measure the temperature of a surface of the workpiece after application of the cooling gas to the as-deposited string of the workpiece is applied by the jet device. The temperature data from the first and second temperature sensors can allow the user to control the cooling rate by adjusting the flow rate of cooling gas applied by jet device, or the duration of the flow of the cooling gas towards the workpiece, or both.

In another aspect of the invention, provided herein are systems for building a metallic object by additive manufacturing, comprising: a first melting tool to preheat a base material prior to deposition of a molten metal; a second melting tool to melt a source of metal into droplets of metallic molten material that are deposited on the preheated base material or into a liquid molten pool on the base material; a jet device provided herein to direct a cooling gas across the liquid molten pool, or to impinge on the liquid molten pool, or to impinge upon a solidified material adjacent to a liquid-solid boundary of the liquid molten pool, or any combination thereof, a supply of the cooling gas; a system for positioning and moving the base material relative to the heating device and jet device; and a control system able to read a design model of the metallic object to be formed and employ a design model to regulate the position and movement of the system for positioning and moving the base material and to operate the heating device and jet device such that a physical object is built by fusing successive deposits of the metallic material onto the base material.

In another aspect of the present invention, provided are methods for manufacturing a three-dimensional object of a metallic material by additive manufacturing, where the object is made by fusing together successive deposits of the metallic material onto a base material, the method comprising: using a first melting tool to preheat at least a portion of a surface of the base material; using a second melting tool to heat and melt a metallic material such that molten metallic material is deposited onto the preheated area of the base material forming a liquid molten pool; using a jet device provided herein to direct a cooling gas across the liquid molten pool, or to impinge on the liquid molten pool, or to impinge upon a solidified material adjacent to a liquid-solid boundary of the liquid molten pool, or to impinge on as-solidified material or any combination thereof; and moving the base material relative to the position of the first and second heating devices in a predetermined pattern such that the successive deposits of molten metallic material solidifies and forms the three-dimensional object. In the methods, a jet device can direct cooling gas jets at the melt pool, or a jet device can direct cooling gas jets to solidified deposited metal region, or one jet device can be direct cooling gas jets at the melt pool, and a second jet device can direct cooling gas jets to a solidified deposited metal region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B are micrographs comparing the typical structure of a deposited Ti-6Al-4V sample (FIG. 5A) to the resulting refined structure with application of melt pool gas jet impingement in a multi-row, multilayered Ti-6Al-4V deposit using the jet device provided herein (FIG. 5B).

DETAILED DESCRIPTION

Figure 1:
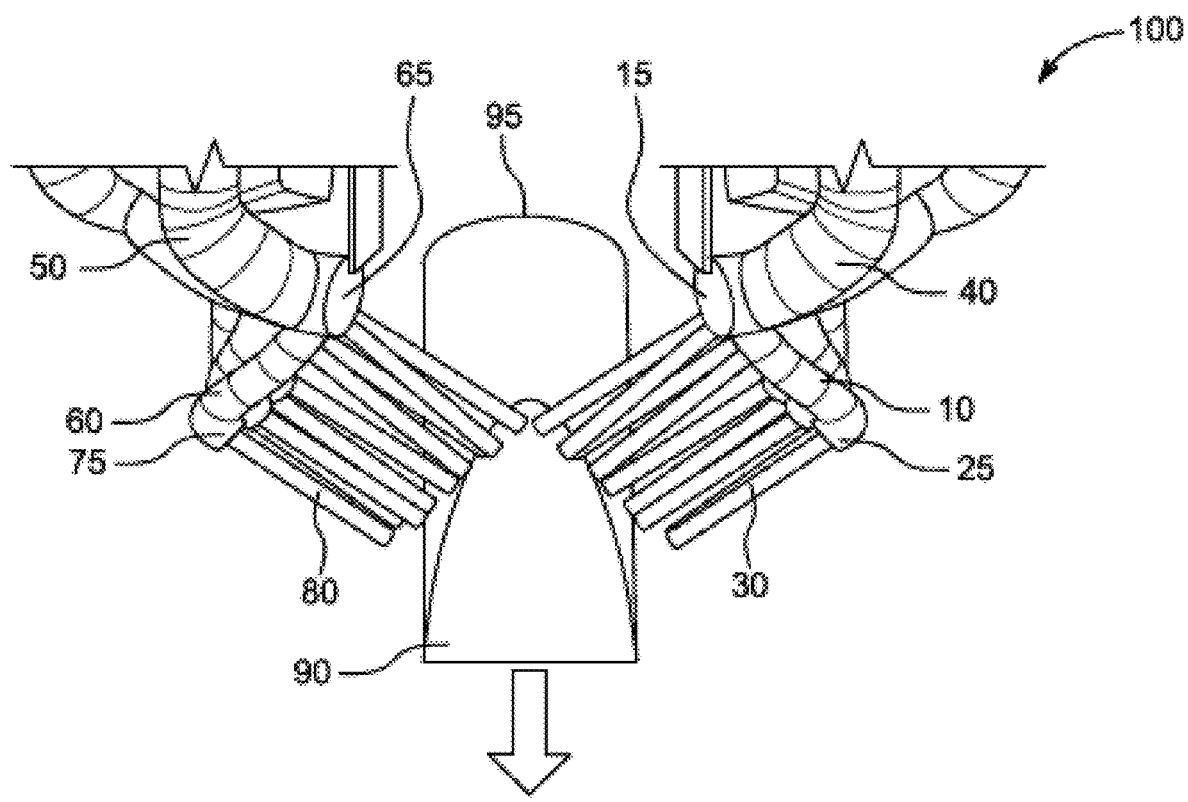
FIG. 1 is a schematic skewed front view depiction of an exemplary jet device that provides directed gas jets to the melt pool free surface and the boundary between liquid and solid as molten material is deposited to form a string. Not represented in the figure is the melting tool situated above the melt pool, or wire or powder feedstock supplied to the melt pool or into the melting arc or laser beam.

Reference will now be made in detail to an embodiment of the present invention, example of which is illustrated in the accompanying drawings.

A. DEFINITIONS

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, "additive manufacturing" is also known as "additive fabrication" and "additive layer manufacturing" and refers to an additive process implementing the manufacturing, layer after layer, of an object from a 3D model data, a metal source, such as wire or powder, and an energy source (such as a plasma arc, laser or electron beam) to melt the metal source.

As used herein, "additive manufacturing system" refers to the machine used for additive manufacturing.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region.

The term "metallic material" as used herein refers to any known or conceivable metal or metal alloy which can be employed in a solid freeform fabrication process to form a three-dimensional object. Examples of suitable materials include, but are not limited to; titanium and titanium alloys such as i.e. Ti-6Al-4V alloy.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along an electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. Current typically is up to 400 A, and voltage typically is in the range of about 25-35 V (but can be up to about 14 kW). PAW torches include plasma transferred arc torches.

The term "base material" as used herein refers to the target material for the heat from a melting tool and on which a molten pool can be formed. The melting tool can be a PAW torch, a PTA torch, a laser device, or any combination thereof. This will be the holding substrate when depositing the first layer of metallic material. When one or more layers of metallic material have been deposited onto the holding substrate, the base material will be the upper layer of deposited metallic material that is to have deposited a new layer of metallic material.

As used herein, the term "workpiece" refers to a metal body being produced using solid free form fabrication.

The term "design model" or "computer assisted design model" or "CAD-model" as used interchangeably herein refers to any known or conceivable virtual three-dimensional representation of the object that is to be formed which can be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate in a pattern which results in building a physical object according to the virtual three-dimensional model of the object. This may, for instance, be obtained by forming a virtual vectorized layered model of the three-dimensional model by first dividing the virtual three-dimensional model into a set of virtual parallel layers and then dividing each of the parallel layers into a set of virtual quasi one-dimensional pieces. Then, the physical object can be formed by engaging the control system to deposit and fuse a series of quasi one-dimensional pieces of the metallic material feed onto the supporting substrate in a pattern according to the first layer of the virtual vectorized layered model of the object.

Then, repeating the sequence for the second layer of the object by depositing and fusing a series of quasi one-dimensional pieces of the weldable material onto the previous deposited layer in a pattern according to the second layer of the virtual vectorized layered model of the object. Repetition continues the deposition and fusing process layer by layer for each successive layer of the virtual vectorized layered model of the object until the entire object is formed. However, the invention is not tied to any specific CAD-model and/or computer software for running the control system of the arrangement according to the invention, and nor is the invention tied to any specific type of control system. Any known or conceivable control system (CAD-model, computer software, computer hardware and actuators etc.) able to build metallic three-dimensional objects by solid freeform fabrication can be used as long as the control system is adjusted to operate one or more melting tools, such as a PAW torch, a PTA torch, a laser heat source, or any combination thereof. The j et device provided herein can be used with these melting tools to achieve the grain refinement described herein.

As used herein, a "high heat resistant material" refers to a material that is not prone to deformation and exhibits low thermal expansion when exposed to temperatures greater than 400° C. Exemplary materials include titanium and titanium alloys.

As used herein, a "jet device" refers to manufactured product that includes one or a plurality of nozzles that direct streams or jets of a cooling gas at the melt pool surface, or across the melt pool, or across the liquid-solid boundary, or on the solidified metal in the vicinity of the liquid-solid boundary, or in situ on a solid as-deposited string, or any combination thereof, to directly influence solidification, refinement, to block the growth of grains across deposited layers, general phase transformation or any combination thereof.

As used herein, "in situ" means that the manufactured product has not been moved outside of the deposition chamber, and refers to the application of a turbulent gas jet during the additive manufacturing process.

As used herein, "jet" refers to the stream of cooling gas ejected by a nozzle.

As used herein, a "nozzle" refers to a projecting part with an opening that can regulate or direct a flow of cooling gas.

As used herein, a "cooling gas" is a gas directed at a melt pool surface, or across the melt pool, or across the liquid-solid boundary, or on the solidified metal in the vicinity of the liquid-solid boundary, or any combination thereof, to directly influence solidification and block the growth of grains across deposited layers. The temperature of the gas can be any temperature that cools the surface with which it interacts. The temperature can be less than 100° C., or less than 50° C., or less than 30° C., or less than 25° C., or less than 10° C., or less than 5° C., or less than 0° C. Gas at a cryogenic temperature also can be used. It has been determined that the effect of gas colder than room temperature has not been found to have a significantly different effect than achieved with room temperature gas.

B. JET DEVICE

Provided herein is a jet device. The jet device is configured to direct jets or streams of gas at the melt pool surface, or across the melt pool, or across the liquid-solid boundary, or on the solidified metal in the vicinity of the liquid-solid boundary, or on a solidified metal, or any combination thereof, in order to directly influence solidification of the molten metal and to block the growth of grains across deposited layers. The jet device and systems and methods that include using the jet device to direct gas jets at the melt pool surface, or across the melt pool, or across the liquid-solid boundary, or on the solidified metal in the vicinity of the liquid-solid boundary, or on a solidified metal, or any combination thereof, can minimize or prevent the directional solidification that form coarse, elongated grain structures typical in conventional metal additive manufacturing processes. The directional solidification in typical additive manufacturing processes is a result of the steep thermal gradients associated with the typical additive manufacturing process.

This invention involves providing a jet device or a combination of jet devices and utilizing a jet device or a combination of jet devices, each jet device comprising a plurality of jet nozzles, that direct streams of a cooling gas at the melt pool surface, or across the melt pool, or across the liquid-solid boundary, or on the solidified metal in the vicinity of the liquid-solid boundary, or on a solidified metal, or any combination thereof, to directly influence solidification and block the growth of grains across deposited layers, or to improve the capability to control thermal conditions in additive manufacturing by application forced convective cooling. The jet device includes two separate conduits. The conduits can be connected by a cross-piece to form a unitary body. A unitary body configuration can be helpful in the placement of the jet device in relationship to the melting tool. Notwithstanding this, the jet device can be provided as two separate segments. The separate segments can be attached to a melting tool, or to a metal material feed, such as a wire feed or metal powder feed by means of any attachment that provides the right position and angle so that the gas jets from the device(s) impinge on a target area, as described herein.

Each conduit, either separately or when joined as a unitary body, is attached via one side to a portion of the equipment comprising the melting tool when the jet device is to deliver cooling gas to a melt pool or an area in the vicinity of the melt pool, or by one side to the metal material feed when the jet device is to deliver a cooling gas to a solidified metal downstream of the melt pool. The opposite side of each conduit comprises one or a plurality of jet nozzles directed toward the workpiece and away from the melting tool. Each jet nozzle is connected to an aperture in the conduit that allows fluid communication between the nozzle and the conduit so that cooling gas can be delivered through the conduit, pass through the aperture of each nozzle, and each nozzle separately can be directed to a location, such as at the melt pool surface, or across the melt pool, or across the liquid-solid boundary, or on the solidified metal in the vicinity of the liquid-solid boundary, or on a solidified metal past the liquid-solid boundary, such as in an allotropic transformation zone or a region where precipitation reactions can occur, ordering the constituents of the alloy to form particles of a secondary phase. In some configurations, the nozzle can direct a stream of cooling gas to two or more locations selected from among the melt pool surface, across the melt pool, across the liquid-solid boundary, on the solidified metal in the vicinity of the liquid-solid boundary and on a solidified metal past the liquid-solid boundary. Each conduit has a fluid connector at one end. The fluid connector allows the conduit to be connected to a source of cooling gas. The opposite end of the conduit is sealed. The diameter of the conduit is larger than the aperture to which each nozzle is attached. For example, the diameter of the nozzle can be in the range of from about 1 to about 10 mm, while the diameter of the opening or the aperture attached to a nozzle can be in the range of from about 0.5 to about 5 mm. In some configurations, the diameter of the nozzle and the aperture is the same, and can be in a range of from about 0.5 to about 5 mm, or from about 1 to about 3 mm. The total number of nozzles is limited only by space constraints on where the jet device is attached. In some configurations, the number of nozzles can be from about 4 to about 24. Instead of individual nozzles, a continuous gas diffuser or grid designed to produce a directed, turbulent flow of cooling gas also can be used as a gas outlet of the jet device.

Each conduit provides a cooling gas to a nozzle or a set of nozzles attached to the conduit. Each conduit can be divided or can include channels, or can contain pipes, tubes or lines, to deliver a separate stream of cooling gas to each nozzle individually. The nozzles on each conduit can be configured to be in rows, with each row containing one, two, three or four nozzles. The nozzles can be configured to allow individual adjustment of the gas flow to each nozzle, or separate gas flows in different sets of nozzles. Each conduit of a jet device can be connected to its own cooling gas supply.

One or both conduits can include one or a plurality of sensors. A conduit can include a flow meter, which allows the rate of flow of gas through the conduit to be measured. Any flow meter known in the art can be used in the system. The flow meter can include a paddle wheel flow meter, a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art are described U.S. Pat. No. 4,422,338 (Smith, 1983); U.S. Pat. No. 4,838,127 (Herremans et al., 1989); U.S. Pat. No. 5,594,181 (Strange, 1997); U.S. Pat. No. 7,707,898 (Oddie, 2010); and U.S. Pat. No. 7,730,777 (Anzal et al, 2010). In some configurations, the conduit can include a notch, indentation or protrusion for the placement or attachment of a flow meter.

A conduit can include a temperature sensor, which allows the temperature of the conduit or the cooling gas within the conduit or both to be measured. Any temperature sensor known in the art can be used. Exemplary temperature sensors include thermocouples, resistance temperature detectors, thermistors, infrared thermometers, bimetallic devices, liquid expansion devices, and combinations thereof. In some configurations, the conduit can include a notch, indentation or protrusion for the placement or attachment of a temperature sensor.

The jet device also can include one or a plurality of temperature sensors to measure the temperature of the workpiece. In some configurations, a jet device configured to direct cooling gas jets at the melt pool or in the immediate vicinity of the melt pool can include a temperature sensor directed to a surface of the workpiece or the melt pool or a combination thereof. A jet device configured to direct cooling gas jets toward a solidified metal region of the workpiece, such as an allotropic transformation zone, can include a first temperature sensor directed to a surface of the workpiece before the area impinged by or exposed to the cooling gas jets, and a second temperature sensor directed to a surface of the workpiece after the area impinged by or exposed to the cooling gas jets in order to measure and/or control cooling rates across the relevant temperature region. The device can include a temperature sensor directed to a post-solidification zone following solidification of the melt pool. The device can include a temperature sensor directed to a post-transformation zone, where cooling deposited solidified metal can undergo an allotropic transformation or other thermochemical reactions. Any temperature sensor known in the art can be used, particularly non-contact temperature sensors. Exemplary temperature sensors include infrared thermometers and infrared pyrometers. In some configurations, the conduit can include one or more notches, indentations or protrusions for the placement or attachment of a temperature sensor. The conduit can be made of or comprise a high heat resistant material. Exemplary high heat resistant materials include titanium and alloys thereof, tungsten and alloys thereof, stainless steel, alloys comprising chromium and nickel, such as Inconel alloys and hastelloy alloys, and an alloy comprising two or more of nickel, iron, cobalt, copper, molybdenum, tantalum, tungsten and titanium. In some configurations, the conduit is made of titanium or a titanium alloy containing Ti in combination with one or a combination of Al, V, Sn, Zr, Mo, Nb, Cr, W, Si, and Mn. In some configurations, the conduit is made of Ti-6Al-4V alloy.

Each conduit can include a plurality of jet nozzles on the ventral side of the conduit, configured to be angled opposite to the direction of travel, towards the trailing edge of the melt pool produced by the melting device and added feedstock material. The nozzles direct a turbulent flow of cooling gas to a location, such as at the melt pool surface, or across the melt pool, or across the liquid-solid boundary, or on the solidified metal in the vicinity of the liquid-solid boundary, or a solidified metal past the liquid-solid boundary. Each nozzle can be positioned at any angle relative to the conduit so that the angle formed between the nozzle and the conduit is 90° or less, such as less than 80°, or less than 70°, or less than 60°, or less than 50°, or less than 40°, or less than 30°. A preferred range of angles is from about 70° to about 30° from horizontal. The nozzles can be configured and positioned to prevent blowing cooling gas toward the melting tool, such as a torch, which would disrupt the arc, or which can decrease the efficiency of the melting tool's ability to melt the consumable electrode or metal wire.

The jet nozzle can be of any shape. In some configurations, the nozzle is configured to be tube-like, having a cylindrical shape. The nozzle can have a rectangular, hexagonal, octagonal, oval or asymmetric shape. The cross-section of the nozzle can be any shape. Exemplary shapes of the cross-sectional opening of the nozzle include circular, oval, ovoid, square, rectangular, rhomboidal, hexagonal, and octagonal. Non-uniform or an asymmetrical cross-section can be selected to promote turbulent flow of the gas out of the nozzle.

The thickness of the walls of the nozzle are sufficient to withstand the pressure of the cooling gas flowing therethrough. The thickness of the walls also can be selected to minimize any thermal deformation at the temperatures to which the jet device can be subjected during the additive manufacturing process. For example, the wall thickness of the nozzle can be in the range of from about 0.25 to about 5 mm, or from about 0.5 to about 3 mm.

The nozzle includes an orifice through which cooling gas flows toward the workpiece. The orifice of the gas nozzle can have any geometry or shape. The orifice can be circular, oval, square, rectangular, rhomboidal, hexagonal, or octagonal. Non-uniform or an asymmetrical cross-section of the orifice can be selected to promote turbulent flow of the gas out of the nozzle. The orifice of the nozzle can have a diameter of from about 0.5 to about 5 mm, or from about 1 to about 3 mm. The diameter of the orifice can be the same as the inner diameter of the nozzle or less. When the diameter of the orifice of the nozzle is less than the inner diameter of the nozzle, the velocity of the gas exiting the orifice can be higher than the velocity of the gas in the conduit. A nozzle can include a plurality of orifices.

Cooling gas enters the jet device via the inlet in each conduit and exits the jet device through each of the nozzles. Each nozzle can deliver a source of cooling gas to a set of nozzles. Each conduit can be divided or can include channels to deliver a separate stream of cooling gas to each nozzle individually. Maximum flow rate of gas delivered to the jet device typically can be about 500 L/min, or 400 L/min, or 300 L/min, or 200 L/min, depending on the configuration and placement of the cooling jet device. For example, for a jet device delivering a cooling gas jet that impinges on a surface of a melt pool a cooling gas flow rate can be selected so that the turbulent gas flow does not deform the molten metal being applied via the melting tool or the path of its application, or cause spattering and instability of the molten metal applied to the string, or detrimentally affect the stability or shape of the melt pool. A range of flow rate of cooling gas can be from about 1 L/min to about 150 L/min, and typically from about 5 L/min to about 100 L/min. A minimum flow to effectively achieve the grain refinement effect is typically 10 L/min, depending on the material to be processed and jet device design. In configurations where the flow of cooling gas to each nozzle can be separately controlled, higher cooling gas flow rates can be directed to the as-solidified metal compared to the metal of the melt pool. The flow rate of cooling gas applied in situ to as-deposited solidified material can be significantly higher than the gas flow directed to the melt pool. In these cooling jet devices, the flow rate of the cooling gas directed to a surface of the as-deposited solidified material in situ can bu up to 500 L/min. Separate gas supplies can be connected to each cooling jet device to allow for separate control of the gas flow rates from the nozzles of the jet devices. For example, a first gas supply provides cooling gas to a jet device directed to a melt pool or in the vicinity thereof, and a second gas supply is connected to a jet device directed to an as-deposited solidified material. Each gas supply can include a regulator that can be adjusted manually or automatically, such as via computer control, to adjust the flow rate of gas supplied to the cooling jet device connected to conduit connected to the regulator. In configurations were a jet device includes a plurality of separate conduits, each conduit of the device can be connected to a separate regulator so that the flow of cooling gas to each conduit can be separately controlled.

The cooling gas can be provided as a steady stream out of the nozzles. The cooling gas can be provided intermittently or in pulses out of the nozzles. The intermittent or pulsed flow of the cooling gas can help to disperse thermal energy away from the area of impingement of the cooling gas. The provision of gas intermittently can be achieved by using valve switches. Pulsed flow refers to time-varying gas flow rates, with no limitation as to the amplitudes, phases and other characteristics of time-varying phenomena. Pulsed flow typically includes a sequential, repetitive use of a plurality of different time-varying gas flow rates. The pulsing of the gas takes place for a time such that the time-varying high flow and low flow conditions are exhibited. The pulsed flow of the gas can be provided using any method or device known in the art (e.g., see U.S. Pat. No. 5,954,092 (Kroutil et al., 1999); U.S. Pat. No. 6,679,278 (Lemoine et al., 2004); and U.S. Pat. No. 9,566,554 (Wu et al., 2017)).

Each conduit can include at least one nozzle, so that a minimum of two nozzles direct a cooling gas at the melt pool surface, or across the melt pool, or across the liquid-solid boundary, or on the solidified metal in the vicinity of the liquid-solid boundary, or on a solidified metal past the liquid-solid boundary, or any combination thereof. The total number of nozzles present in the jet device can vary depending on the desired configuration. In some configurations, the jet device has a total number of nozzles from 2 to 24. The number of nozzles on each conduit can be the same or different. For example, each conduit can include 10 nozzles, yielding a jet device with 20 nozzles. In another example, one conduit can have 8 nozzles and the other conduit can have 12 nozzles, yielding a jet device with 20 nozzles but having a configuration different from the first jet device that has 10 nozzles on each conduit.

The number, configuration and spacing of the nozzles can be selected so that the coverage by the cooling gas jetted from the nozzles covers a desired length of the workpiece being formed. For example, in a high deposition rate process, such as a plasma and wire-based system, the number of nozzles and their configuration can be selected to result in a delivered cooling gas that covers a length from about 5 mm to about 50 mm, or from about 10 mm to about 40 mm, or from about 15 mm to about 30 mm, along the direction of travel. The nozzles can be configured to deliver a cooling gas that covers a length of about 20 mm along the direction of travel.

The length of each nozzle can be the same, or different nozzles can have different lengths. Typically, each nozzle can have a length sufficient to produce a directional flow out the orifice. For example, the length can be in a range of from about 2.5 mm to about 25 mm, or from about 5 mm to 20 mm. The length of each nozzle and its position can be selected so that a flow of cooling gas can be applied across the deposited molten material. The nozzles can be provided in pairs or groups, where the length of each nozzle and its position are selected to result in a configuration in which one member of the pair directs or some members of the group direct cooling gas to impinge on one location, and the other member of the pair directs or the other members of the group direct cooling gas to another location. For example, one group of nozzles can be directed on a melt pool surface, while another group of nozzles can be directed to solidified material The number, configuration and spacing of the nozzles can be selected to promote a turbulent gas flow in the vicinity of the melt pool surface, or the liquid-solid boundary, or the solidified metal in the vicinity of the liquid-solid boundary, or any combination thereof. For example, the nozzles can be positioned so that the jets of cooling gas from at least two nozzles impinge on each other, creating turbulent flow. One or more of the nozzles can include a protrusion or an indentation or a combination thereof in the orifice of the nozzle or within the body of the nozzle to interfere with laminar flow of the cooling gas to promote turbulent flow. The velocity of the cooling gas flowing through the nozzle also can be monitored and adjusted so that the cooling fluid exiting the nozzles exhibits turbulent flow instead of laminar flow. Turbulent flow can be created during the interaction of the impinging gas jets with laminar boundary layers near the workpiece. The cooling effect is increased with turbulent flow of the cooling gas. The conduits can include one or more baffles in the cooling gas flow path. Gas hitting a baffle can transfer the directed kinetic energy induced by the shock upon impact with the baffle into rotational energy resulting in turbulent mixing or turbulent flow.

A thermal insulating material can be used to thermally isolate the jet device from the melting tool or the molten pool or the metal material feed or any combination thereof. The thermal insulating material can be positioned between the jet device and the melting tool, or between the jet device and the metal material feed, or on a surface of the jet device facing the molten pool of the workpiece.

The thermally insulating material can include any material suitable for use at the temperatures near the plasma arc, the laser device or the molten pool. The thermally insulating material can be or contain a thermally insulative ceramic. Such ceramics are known in the art and can include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). The thermally insulating material can be or contain aluminum nitride, aluminum oxide, magnesium nitride, magnesium oxide, quartz, silicon nitride, boron nitride, or zirconium dioxide, or a mixture or a combination thereof.

A skewed front view drawing of an exemplary embodiment of the jet device configured for delivery of a gas jet to a melt pool is shown in FIG. 1. The direction of travel of the workpiece is indicated by the arrow (in this instance, the depicted direction of travel is toward the observer). The jet device 100 depicted in the figure includes on one side a first conduit 10 containing five pairs of nozzles 25 that direct gas jets 30 toward the deposited string 95 and melt pool 90 of the workpiece. The jet device shown also includes a second conduit 60 containing five pairs of nozzles 75 that direct gas jets 80 toward the deposited string 95 and melt pool 90 of the workpiece. The jet device 100 directs cooling gas jets to the melt pool free surface and the boundary between liquid and solid, as molten material is deposited to form a string 95. A cooling gas supply 40 provides cooling gas to the first conduit inlet 15. A cooling gas supply 50 provides cooling gas to the second conduit inlet 65. A similar configuration of conduits and nozzles is present on the opposite side of the melting tool 200, although only the gas jets are visible in the figure.

In typical configurations, the melting tool can be situated above the melt pool, and wire feedstock or powder feedstock are supplied to the melt pool or into the melting arc or beam. The jet device also can be positioned so that each conduit of the jet device is mounted on either side of the melting tool and the nozzles can be directed in such a way as to direct a jet of cooling gas to the melt pool free surface or the boundary between liquid and solid molten material.

Figure 2:
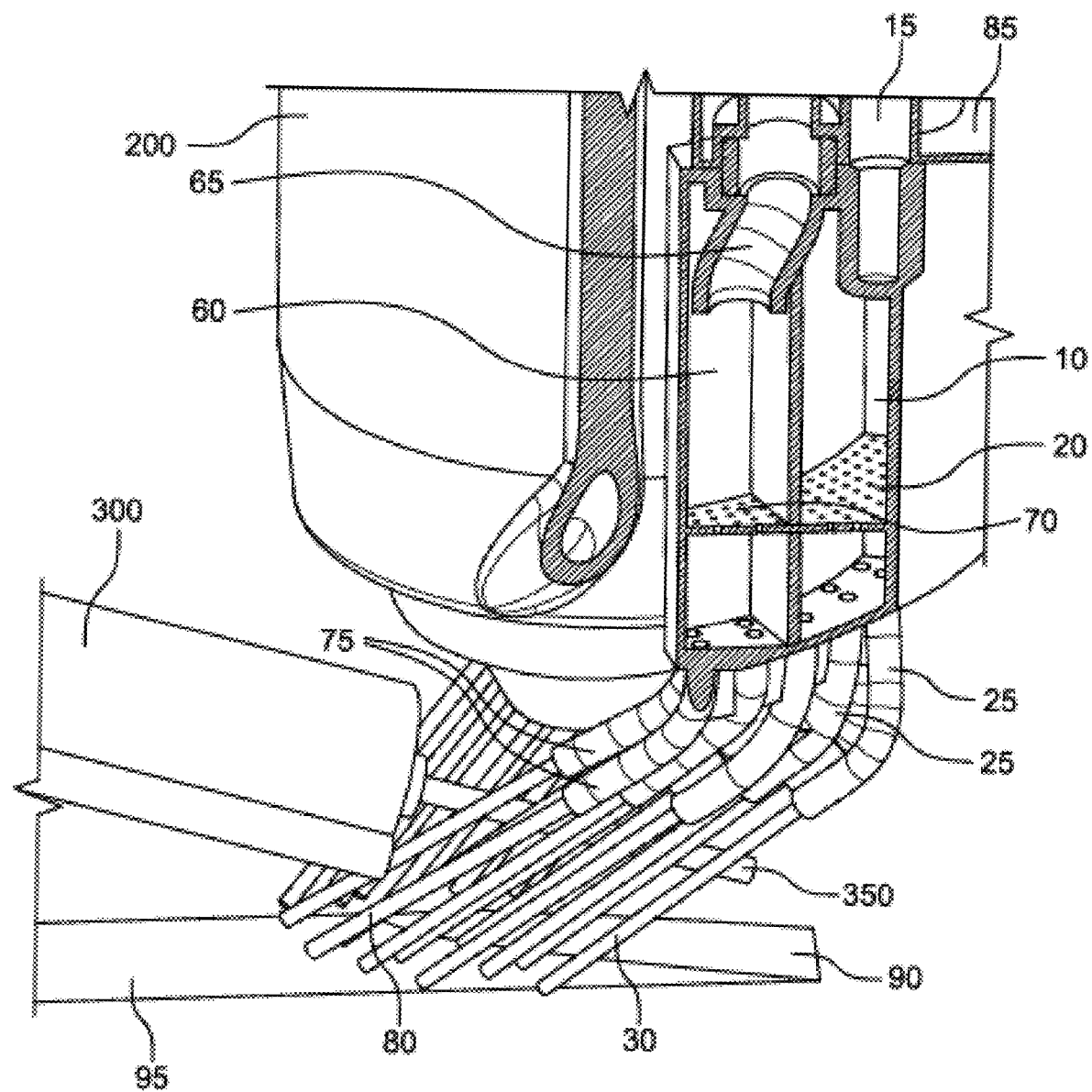
FIG. 2 is a partial cutaway side view of an exemplary configuration of the jet device.

A partial cutaway side view of an exemplary configuration of the jet device configured for delivery of a gas jet to a melt pool is shown in FIG. 2. The depicted jet device includes a first conduit 10 containing a group of nozzles 25 and a second conduit 60 containing a group of nozzles 75. A similar configuration occurs on the other side of the melting tool 200 to which the jet device is attached. The illustrated jet devices shows that the conduits on either side of the melting tool are connected by a cross-piece 85 to form a unitary body. Also shown in FIG. 2 is an internal diffuser 20 within the conduit 10 and a diffuser 70 within the conduit 60, which can help to even gas pressure and flow out of the nozzles. The grey lines 30 and 80 indicate gas jet direction from the nozzles 25 and 75, respectively. Cooling gas is provided to conduit 10 via inlet 15, and cooling gas is delivered to conduit 60 via inlet 65. Also shown in FIG. 2 is a wire feed 300 that delivers metal wire 350 to a position above the melt pool 90.

Application of the cooling gas from the jet device as gas jets 30 and 80 to the melt pool 90, or the boundary between liquid and solid molten material, or both, can help to nucleate and propagate an opposing solidification front from the melt pool free surface, forming a top cap of finer grains that will block the continued growth of directional grains across layers. The effect can be more pronounced in high deposition rate processes where solidification rates typically are lower and the directional solidification front moves slow enough to allow the top cap to form and propagate further than the depth that will be re-melted by consecutive layers. The mechanism is illustrated in FIG. 3.

Figure 3:
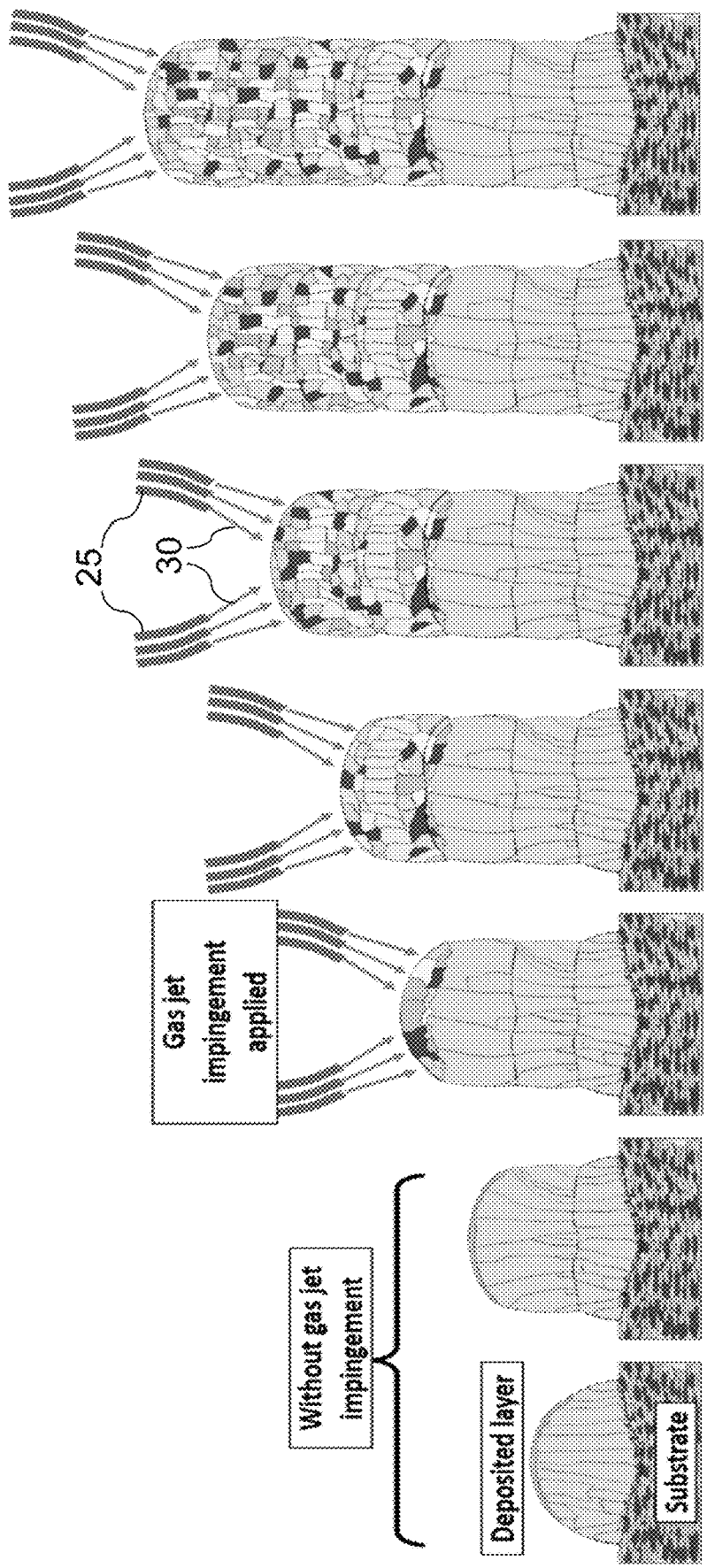
FIG. 3 is a schematic illustration of the cross-section of a single row wall deposit as layer upon layer is fused. The illustration shows typical unrefined grain growth in the first 3 layers, followed by the refinement mechanism of columnar grain growth blocking by application of gas jet impingement using the jet device provided herein.

As illustrated in FIG. 3, at the far left, deposition of metal during traditional additive manufacturing results in coarse, as-solidified grain structures and can exhibit columnar grain growth. Depending on the alloy, the resulting grain structures also can be elongated with a high aspect ratio. This typically is the result of the directional heat extraction provided by the relatively colder workpiece as superheated molten metal is added to it in the string. In these conventional processes, initiation of solidification begins from the previously deposited metal layer(s), and propagates up into the deposited material as the deposited layer cools. The as-solidified grain structures can in many cases extend across several layers, and can grow to be to several centimeters in size. These characteristics are typically detrimental to mechanical properties, giving rise to reduced and/or anisotropic strength, elongation and fatigue performance.

The jet devices provided herein delivers a cooling gas. The cooling gas delivered by the cooling jet devices can be any gas that does not interfere with the welding process used for deposition of molten metal to form the string during additive manufacturing. Exemplary cooling gases include argon, helium, neon, xenon, krypton and blends thereof. Typically, the cooling gas comprises argon, alone or in combination with another gas. The temperature of the cooling gas delivered to the inlet of the jet device typically is less than 100° C., or less than 80° C., or less than 60° C., or less than 40° C., or less than 25° C. The cooling gas can be delivered to the inlet of the jet device at a temperature of about room temperature or below, such as about 25° C. or less, or about 20° C. or less, or about 15° C. or less, or about 10° C. or less. The cooling gas can be delivered to the inlet of the jet device at a temperature of from about −195° C. to about 25° C. The application of the cooling gas by the jet device to the melt pool, or the boundary between liquid and solid as molten material cools, or both, results in efficient refinement of the metal grains, producing finer grains than achieved in the absence of the application of the cooling gas.

Application of the cooling gas from the jet device to the melt pool, or the boundary between liquid and solid as molten material cools, or both, also can help reduce temperature gradients at the directional solidification front typically present using conventional additive manufacturing techniques. The reduction in temperature gradients in the directional solidification front can destabilize continued propagation because of the cooling effect of the applied cooling gas on the free melt pool surface.

Application of the cooling gas from the jet device to the melt pool, or the boundary between liquid and solid as molten material cools, or both, also can help redirect solidification through the cooling effect on as-solidified material adjacent to the liquid-solid boundary. The application of the cooling gas can alter heat extraction from the trailing edge of the melt pool. The application of the cooling gas also can increase overall solidification rates. Formation of columnar grain structure is minimized or prevented as a result of the mechanisms detailed above. Grain refinement is the effect promoted by the application of cooling gas by the jet device provided herein. As a result of the application of cooling gas by the jet device provided herein, grain refinement, such as the formation of approximately equiaxed grain structure, is induced, thereby improving the mechanical properties of the manufactured product.

To maximize effect of the jet device, other process parameters are typically set such that they are conducive to break-up of the solidification front by managing processing temperature and energy input such that a certain length of the melt pool is maintained for the gas jets to impinge on, and temperature gradients in the workpiece are minimized. For example, the processing temperature will depend on which alloy is being utilized, but typically is maintained within a range of about 300° C. to about 750° C. Energy input also will depend on which alloy is being utilized. Effective energy input for Ti-6Al-4V in a high deposition rate plasma and wire-based process typically can be from about 300 J/mm to about 1000 J/mm. Thermal gradients in the workpiece can be minimized by processing at higher workpiece temperatures (interpass temperature) and with lower energy input per length unit.

Elimination of coarse columnar solidification structures that characteristically occur during additive manufacturing is expected to be beneficial in order to achieve an optimal balance of strength, ductility and fatigue properties in additively manufactured products, including titanium-based products, such as Ti-6Al-4V products. By manipulating the melt pool conditions, such as by using the jet device provided herein to direct cooling gas jets at the liquid-solid boundary of the melt pool, induces and accelerates opposing solidification front at the free melt pool surface. This can reduce or significantly eliminate formation of elongated columnar structures that can impose restriction in the number of favorable grain variations that can form, thereby increasing the diversity of crystallographic orientations in the deposited material.

During additive manufacturing, the deposited material experiences changes in temperature from the melt pool through an area of solidifying crystals to a solidified metal area and an area of microstructure transitions. Thus, by manipulating the conditions throughout the deposition process in addition to the melt pool, such as by controlling or modulating the cooling rate in the metal solidification or transition areas, or both, formation of desired microstructure can be promoted. Crystallography and morphology of microstructures formed by allotropic transformation or other mechanisms, depending on the alloy, can be affected by as-solidified grain structure through orientation relationships, grain boundary nucleation and alignment caused by differences in interfacial energy, diffusion rates and thermal conductivity between the different crystallographic directions in an alloy lattice as the deposited material cools and undergoes solidification and solid-state transformation. Differences in thermal history can result in a pronounced differences in strain response across different grain boundaries in many alloys The jet device provided herein can be used to control or modulate cooling rate throughout the deposition process, and thereby influence the thermal history of the piece produced by additive manufacturing. Forced cooling through concentrated turbulent flow of jets of cooling gas can be applied on the as-solidified material using the jet device to control heat transfer, thermal conductivity, thermal energy dissipation and solid-state phase transformation. The jet device can achieve localized cooling and temperature measurement on targeted areas of the deposit between string depositions, to precondition and even out workpiece temperature in preparation for consecutive layers.

Figure 7:
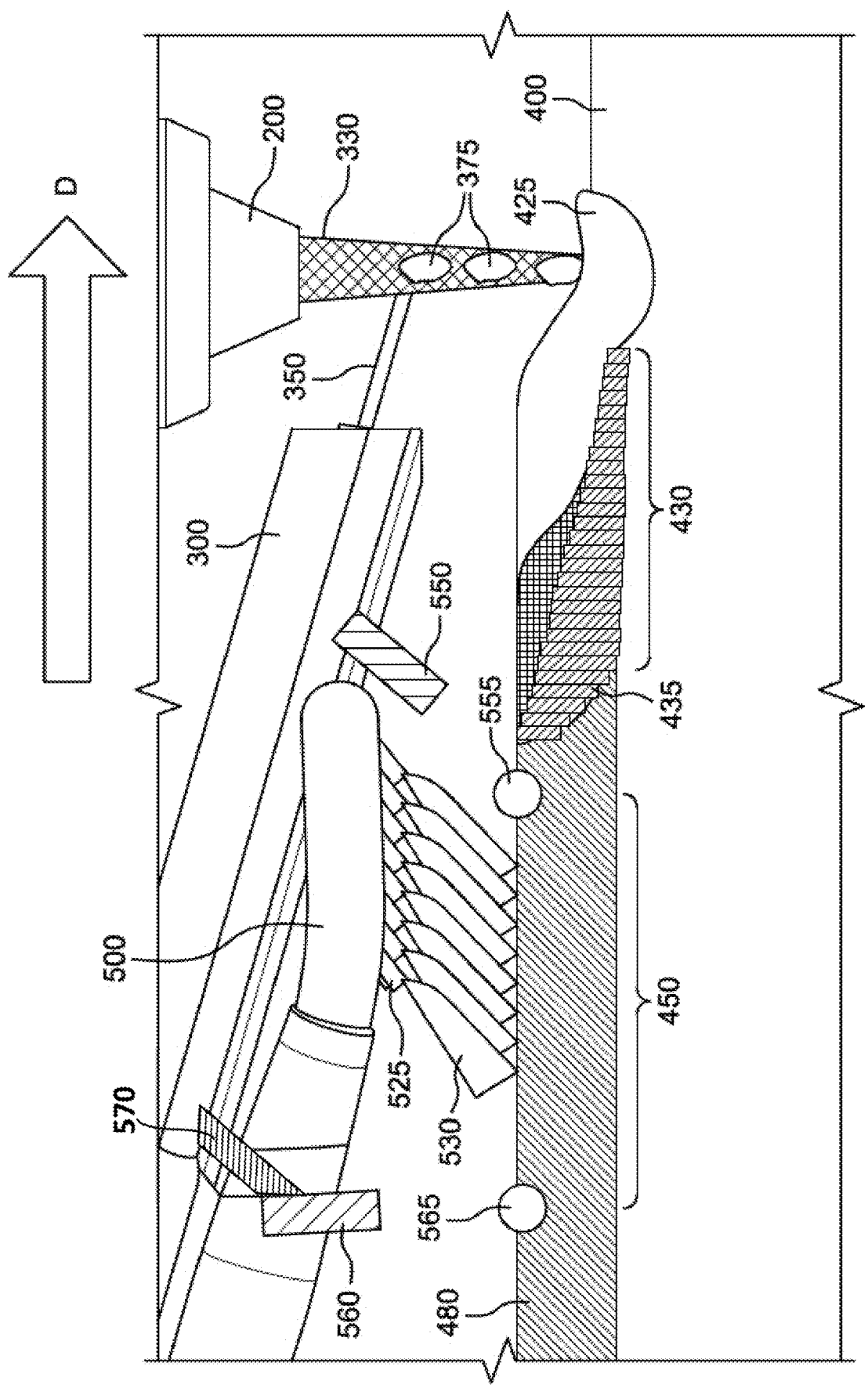
FIG. 7 is a schematic side view depiction of an exemplary jet device that provides directed gas jets to a solidified metal region as molten material in the melt pool cools to form a string in order to affect additional phase transformations occurring after solidification and further cooling. A melting tool situated above the melt pool provides energy to melt a metal wire or powder feedstock into molten metal that drops into the melt pool. A temperature sensor can be located in front of the jet device to measure the temperature of the as-forming string and a temperature sensor can be located trailing the jet device to measure the temperature of the solidified metal of the string during or after application of the gas jet.

A side view of an exemplary configuration of the jet device configured for delivery of a gas jet to an area of solidified metal is shown in FIG. 7. The depicted embodiment of the cooling jet device 500 includes a plurality of nozzles 525 that produce cooling gas jets 530 and that are attached on one side of a wire feed 300. A similar configuration can occur on the other side of the wire feed 300 to which the jet device is attached. In alternate embodiments, one or more rows of nozzles can be present on the underside of wire feed to which the jet device is attached. In an alternate embodiment, the jet device can include a U-shaped conduit parallel or nearly parallel to the workpiece, the arms of which can be located on either side of the forming string of the workpiece and including nozzles directed downward toward the workpiece. The nozzles can be directed so that the cooling gas jets 530 impinge on an upper surface of the workpiece, or on a side surface of the workpiece, or on both an upper surface and at least one side surface of the workpiece. In an alternate embodiment, the jet device can include a trident- or ψ-shaped conduit (U-shaped conduit bisected by a separate conduit parallel to the arms of the U) parallel or nearly parallel to the workpiece, where the side arms of which are located on either side of the forming string of the workpiece and include nozzles directed downward towards an upper surface of the forming string or a side surface of the forming string, and the central conduit includes nozzles directed downward toward an upper surface of the forming string of the workpiece. In an alternate embodiment, the jet device can include three separate conduits in parallel, each with its own gas supply. One outer conduit can include nozzles directed to one side surface of the deposited string, the other outer conduit can include nozzles directed to the other side surface of the deposited string, and the central conduit can include nozzles directed to an upper surface of the deposited string. The positioning of the sensors and the jet device can be adjusted depending on the targeted temperature region deemed to be critical for determining and effecting the cooling rate. Therefore, the positioning can be adjusted based on the metal alloy to be deposited.

Also shown in FIG. 7 is a temperature sensor 550 attached to allow a temperature reading to be taken on a workpiece surface in front of the zone of application of the jets of cooling gas. Also shown in FIG. 7 is a temperature sensor 560 attached behind the jet device 500 to allow a temperature reading to be taken in a zone of the workpiece after application of the jets of cooling gas. The direction of travel of the workpiece is indicated by the D arrow (in this instance, the depicted direction of travel of the workpiece is from left to right). In the embodiment depicted in shown in FIG. 7, the cooling jet device 500 and temperature sensors 550 and 560 are shown connected to the wire feed 300, but such attachments are illustrative only. Brackets or mounting arms separately can be used to attach any of the cooling jet device 500 and temperature sensors 550 and 560 to one or more components of the system that allow movement with the melting tool 200, application of the cooling gas to the desired surfaces of the workpiece, and appropriate temperature measurement of the workpiece. The gas jets are directed in such a way as to not disturb the melt pool or metal transfer, and to provide cooling through a backwards gas flow along the deposited string. The application of the cooling gas to the solidified metal can achieve suitable local cooling for a period determined by the temperature readings from temperature sensors that thereby can achieve continuous cooling rate control during material addition, and local preconditioning between string depositions. Flow rates of the cooling gas jets from the jet device direct to a region of the workpiece of solidified metal after the melt pool can be adjusted based on thermal conditions in the workpiece during processing, either by taking in situ measurements or following a pre-programmed computerized schedule based on readings received from the temperature sensors before and after the area of impingement of the cooling gas jets. Suitable cooling can be achieved by applying a flow of cooling gas for a period of time, which can be determined by the data received from the temperature sensors before and after the area of impingement of the cooling gas. The positioning of the temperature sensors and jet device can depend on which temperature region of the workpiece is most critical to capture and affect the cooling rate. The positioning can be adjusted based on the metal alloy to be deposited.

The jet device allows for continuous cooling rate control during material addition, and preconditioning between string deposits without terminating the deposition process. Flow rates can be adjusted based on changing thermal conditions in the workpiece during processing, either manually by monitoring of the data from the temperature sensors, or automatically using a computer that receives temperature data from the temperatures and adjusts the flow rate or duration or both to achieve a targeted cooling rate. Infrared temperature sensors can be selected and calibrated for the relevant temperature ranges experienced in the workpiece and deposition process. Sensor data can be measured and stored at a rate of 1 Hz or higher. The temperature data can be captured by a computer in a process control system to allow in-process feedback control of the deposition process, or viewed post-process and manually adjusted as part of an iterative deposit development phase to produce a deposition schedule, or a combination of these techniques. Flow can be zero or near zero in the first deposited layer, then increased as residual heat has built up. Flow rates can range from zero or near zero to up to about 500 L/min. Flow rates can range from zero or near zero to up to about 400 L/min. Flow rates can range from zero or near zero to up to about 300 L/min. In some applications, the cooling gas flow rate can be at least 10 L/min, or at least 25 L/min, or at least 50 L/min, or at least 100 L/min, or at least 150 L/min, or at least 200 L/min, or at least 250 L/min, or at least 300 L/min, or at least 350 L/min, or at least 400 L/min, or 500 L/min or less, or 450 L/min or less, or 400 L/min or less, or 350 L/min or less, or 300 L/min or less, or 250 L/min or less, or 200 L/min or less, or 250 L/min or less, or 200 L/min or less, or 150 L/min or less, or 100 L/min or less, or 50 L/min or less. The cooling has can be inert or non-inert, depending on the requirements of the alloy to be processed. The cooling gas can be elemental, or a mix of different gases.

The jet device can apply suitable cooling for a period of time in these areas to effectively remove the excess thermal energy applied during deposition. The jet device allows application of cooling gas directly on the deposited metal while deposition is taking place to achieved localized cooling rate control, as well as local cooling rate and temperature measurement on areas of the deposit string deposition, allowing preconditioning or evening out of workpiece temperature or both in preparation of consecutive layers. High velocity cooling gas can be delivered by the jet device to areas of consecutive layers of deposited material.

Conventional welding processes can apply a shielding gas device trailing the welding torch to direct a laminar flow gas curtain towards the solidified material in order to protect the deposited material from the surrounding atmosphere and avoid contamination of the weld metal. This laminar flow of gas is insufficient to affect or control temperature dissipation or cooling rate. The jet devices provided herein apply jets of cooling gas at a flow rate sufficient to result in turbulent flow of the gas. Turbulent flow of the cooling gas from the nozzles of the jet device typically can be achieved through a high velocity of the cooling gas through the nozzles.

C. SYSTEMS

Typical additive manufacturing technology, especially high deposition rate processes, often can exhibit significant variation in processing conditions due to variations in deposit geometry. Local workpiece temperature in a large deposit with greater time between repetitions (i.e., longer time per layer) will have very different temperature conditions compared to a smaller deposit where strings can come in quick succession and heat is allowed to accumulate. Similarly, local mass input can determine or effect the cross-section of heat extraction from the deposited material, and adjacent mass affect the capacity of the heat sink to handle the added thermal energy.

These factors can result in non-optimal and variable material properties. In many cases, post-process heat treatment beyond a basic stress relief is either impractical or ineffective for a multitude of metal alloys. Crucially, the fully formed deposit may have a section thickness that does not allow a bulk heat treatment to achieve the desired cooling rates. The systems for building a metallic object by additive manufacturing provided herein overcome these shortcoming of prior art systems. The piece-by-piece method of additive manufacturing utilizing the jet devices provided herein can allow for cooling rate control in the smaller volumes of material of the individual strings that the final part is comprised of during the deposition process. The systems are flexible and highly controllable and provide a way to improve consistency of metal additive manufacturing products, particularly for large scale, high deposition rate processes. The systems can include a computer, which can be used to automate a part or all of the system. The computer can be in communication with a control system and can be used to read a design model. The computer can collect data, store and/or manipulate data, such as flow rates and temperatures, or other parameters of the manufacturing process. The computer can use the collected data as to operate or modify the manufacturing process. The computer can include a computer processor that can be in communication with one or more of the components of the system.

As a deposited string solidifies and cools down, most relevant alloys undergo significant solid state transformations that can have a profound effect on material properties. One example includes allotropic transformations where the crystal structure arrangement changes to another crystal structure arrangement. Many titanium alloys exhibit allotropic transformations in a temperature range during cooling from 1050° to 800° C. For many steels, the temperature range during cooling for transformation typically is from 800° to 400° C. Another example of a solid state transformation in the deposited metal during cooling is a precipitation reaction, where the ordering of constituents of the alloy form particles of a secondary phase. As an example, nickel-based superalloys can exhibit precipitation reactions during cooling from about 1000° to 700 C, and for prolonged residence above 600° C. Grain growth during prolonged residence at higher temperatures also affects the properties of most alloys. The jet devices provided herein can affect or control cooling rate thereby allowing modification of the properties of the deposited material, resulting in improved consistency of the metal additive manufactured products. The systems provided herein allow for continuous cooling rate control during material addition, and local preconditioning between string depositions. The systems provided herein allow for control of processing conditions for the manageable volume of an individual string segment. The systems allow for temperature control during deposition, achieving results not possible using a post-process heat treatment, where controlling cooling rate in the thicker sections of a full additive-manufactured deposit are more difficult, and the high cooling rates achievable using the jet devices provided herein are not achievable using a post-process heat treatment without the use of less practical methods such as quenching in water or oil.

The systems provided herein can include a melting tool to melt a source of metal into droplets of metallic molten material that are deposited into a liquid molten pool on a base material; a jet device as provided herein to direct a cooling gas across the liquid molten pool, or to impinge on the liquid molten pool, or to impinge upon a solidified material adjacent to a liquid-solid boundary of the liquid molten pool, or any combination thereof; a supply of the cooling gas; a system for positioning and moving the base material relative to the heating device and jet device; and a control system able to read a design model, such as a computer assisted design (CAD) model, of the metallic object to be formed, and employ the design model to regulate the position and movement of the system for positioning and moving the base material and to operate the heating device and jet device such that a physical object is built by fusing successive deposits of the metallic material onto the base material.

A single melting tool can be used, or a two gun system comprising two melting tools can be used. It has been determined that the deposition rate of molten metal to a forming workpiece can be increased using a two gun system in which a first gun preheats the base material to form a preheated area, and a second gun is used to heat and melt a metal onto the preheated area of the base material. The first gun can ensure fusion between the base material or workpiece and the molten metal produced by the action of the second gun on a metal, such as a metal wire or metal powder. The first gun can deepen the melt-in of the molten metal into the preheated area of the base material. The superheat from the droplets of molten metal can maintain a melt pool in the vicinity of the preheated area of the base material. The pre-heating of the base material can lead to better wetting, better deposition profile and increased deposition rate. Regarding deposition profile, by pre-heating the substrate, it is possible to obtain a rounder and wider deposit profile. The improved profile can result in a profile with a beneficial angle towards the base material, which can promote fusion to the base material and previous metal depositions. Improved fusion yields a manufactured product with improved integrity.

Each of the guns includes a melting tool. Each gun can be separately controlled, and each gun can be modulated to produce a separate temperature effect. An advantage of this arrangement is that the amount of thermal energy applied to the metallic feed stock to be melted onto the preheated area of the base material can be greater than that applied to the base material, avoiding over-heating of the base material.

In an embodiment of the two gun additive manufacturing system provided herein, the system can include a torch (PAW, PTA, GMAW or MIG-type) or a laser device or any combination thereof as a melting tool. In some configurations, a first torch pre-heats a target deposition area on the base material to form a preheated area, and a second torch heats and melts a consumable electrode, resulting in drops of molten metal that fall into the preheated area of the target deposition area. In some configurations, the laser device pre-heats a target deposition area on the base material to form a preheated area, and a torch heats and melts a consumable electrode, resulting in drops of molten metal that fall into the preheated area of the target deposition area. In some configurations, the torch pre-heats a target deposition area on the base material to form a preheated area, and a laser device heats and melts a metal wire, resulting in drops of molten metal that fall into the preheated area of the target deposition area.

A laser device or a torch can be arranged to direct thermal energy (e.g., laser energy or a plasma transferred arc, respectively) to a target area of the base material to form a preheated area, and a torch or a laser device can be arranged to direct thermal energy onto an end of a consumable electrode or metal wire positioned above the preheated area of the base material. The thermal energy melts the end of the consumable electrode or metal wire, forming droplets of molten metal that drop onto the preheated area of the base material beneath the end of the consumable electrode or metal wire. The melting tool that directs thermal energy to a target deposition area can promote fusion between the base material and the molten metal material being deposited thereon by deepening the melt-in of the droplets of molten metal into the base material. The melting tool used to melt the consumable electrode or metal wire also can contribute thermal energy in the vicinity of the preheated area of the target deposition area, contributing to the thermal energy provided by the melting tool directed to the base material. The superheat from the droplets of molten metal can help maintain a melt pool in the vicinity of the preheated area of the base material.

The consumable electrode or metal wire can be or contain Al, Cr, Cu, Fe, Hf, Sn, Mn, Mo, Ni, Nb, Si, Ta, Ti, V, W, or Zr, or composites or alloys thereof. In some embodiments, the consumable electrode is a wire that contains Ti or a Ti alloy. The consumable electrode or metal wire can be or contain a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si. The consumable electrode or metal wire can contain aluminum, iron, cobalt, copper, nickel, carbon, titanium, tantalum, tungsten, niobium, gold, silver, palladium, platinum, zirconium, alloys thereof, and combinations thereof.

A typical cross section of the consumable electrode or metal wire is a circular cross section. The diameter of the consumable electrode or metal wire can be up to about 10 mm, and can be in the range of from about 0.8 mm to about 5 mm. The consumable electrode or metal wire can have any practically implementable cross-sectional dimension, e.g., 1.0 mm, 1.6 mm, and 2.4 mm, or from about 0.5 to about 3 mm. The feed rate and positioning of the consumable electrode or metal wire can be controlled and modulated in accord with the effect of the power supply to the PTA torch or laser device or both in order to ensure that the consumable electrode or metal wire is being continuously heated and is melted when it reaches the intended position above the molten pool in the base material.

The laser device can generate a laser beam of sufficient energy to transfer thermal energy to the base material to preheat an area of the base material, or to melt a metal wire. The preheating of the base material via energy from the laser beam promotes fusion between the base material and the melted metallic material by deepening the melt-in in the base material. In some embodiments, at least a portion of the base material can be melted by the energy from the laser beam of the laser device. In some embodiments, sufficient heat is applied by the laser beam of the laser device to form a molten pool in the base material at the position at which the metallic material produced by the PTA torch or another laser is to be deposited.

Examples of suitable laser devices include a ytterbium (Yb) laser, a Yb fiber laser, a Yb fiber coupled diode laser, a Yb:glass laser, a diode-pumped Yb:YAG laser, a neodymium-doped yttrium aluminum garnet (Nd:YAG) laser, a $CO_2$ laser, a CO laser, a Nd:glass laser, a neodymium-doped yttrium orthovanadate (Nd:YVO) laser, a Cr:ruby laser, a diode laser, a diode pumped laser, an excimer laser, a gas laser, a semiconductor laser, a solid-state laser, a dye laser, an X-ray laser, a free-electron laser, an ion laser, a gas mixture laser, a chemical laser, and combinations thereof. Preferred lasers include Yb lasers, particularly Yb fiber lasers. In many applications, the wavelength used in a Yb fiber laser can be less reflective compared to other laser wavelengths.

The torch can be of any configuration capable of creating an electric arc to heat and melt the consumable electrode, or to heat a target area on the base material, such as gas metal arc welding (GMAW), particularly using non-reactive gases to make the arc (metal inert gas welding or MIG-welding). Thus, the torch can be a PAW torch, a PTA torch, a GMAW torch or a MIG-type torch. The consumable electrode is made to melt in the plasma produced by the torch using an electric arc, and the melting consumable electrode is deposited into the molten pool on the workpiece to add to and to form the near net shape metal bodies. The preheating of the base material via energy from the torch promotes fusion between the base material and the melted metallic material by deepening the melt-in in the base material. In some embodiments, at least a portion of the base material can be melted by the energy from the plasma of the torch. In some embodiments, sufficient heat is applied by the plasma of the torch to form a molten pool in the base material at the position at which the metallic material melted by a different torch or laser device is to be deposited.

The use of a first melting tool to preheat the base material and form a preheated area, and a second melting tool to melt the consumable electrode or metal wire provides the advantage that it becomes possible to increase the thermal energy directed to the consumable electrode or metal wire independently of the heat supply to the substrate. The melting power applied to the consumable electrode or metal wire can be selected to match the mass input (the amount of molten metal droplets of consumable electrode or metal wire to be added to the workpiece) in order to secure a stable melting of the consumable electrode or metal wire and/or burn-off point. Thus, it is possible to increase the deposition rate of the molten metal without simultaneously over-heating the substrate and without risk of spatter or forming an excessive molten pool and thus, losing control of the consolidation of the deposited material.

The systems for manufacture of near net shape metal bodies using additive manufacturing provided herein utilize a jet device that significantly alleviates the problems related to metal grain columnarity and large grain size evident in many traditional additive manufactured products. The grain structure in the manufactured product using the systems provided herein that include a jet device for delivery of a cooling gas jet to a melt pool or to a vicinity of a melt pool, or a jet device for delivery of a cooling gas jet to a solidified metal, or a first jet device for delivery of a cooling gas j et to a melt pool or to a vicinity of a melt pool and a second jet device for delivery of a cooling gas jet to a solidified metal, produce a manufactured metal product having metal grains that are approximately equiaxed and that exhibit a refined structure. Using one or more jet devices provided herein to apply a cooling gas during additive manufacture to create gas jet impingement on the free surface of the melt pool, or across the molten pool, or at the boundary between liquid and solid as the molten metal cools, or to a solidified metal beyond the liquid-solid boundary, or any combination thereof, results in a manufactured products having a refined grain structure, and the products produced using these systems demonstrate increased strength, fatigue resistance, and durability.

A jet device directing jets of inert gas at the liquid-solid boundary of the melt pool can induce or accelerate opposing solidification front at the free melt pool surface. Blocking of epitaxy can be achieved as consecutive layers nucleate and solidify from the top-layer grains. Forced cooling through concentrated turbulent flow via a jet device directed to a region of as-solidified material can control or modulate solid-state phase transformation, precipitation reactions and other secondary phase phenomenon that can influence final crystal structure and localized ordering.

A depiction of an exemplary system that includes a jet device directing a turbulent flow of cooling gas in situ on the as-solidified material of a deposited layer 480 to increase cooling rate by applying jets of cooling gas in situ to an as-deposited solidified material is depicted in FIG. 7. The depicted system includes a single melting tool 200 that is a main melting tool that produces a main PTA arc 330 that heats and melts a metal wire 350 from a wire feed 300, forming droplets of molten metal 375 that drop into and form a melt pool 425 on the workpiece 400. Forced cooling of as-deposited material during the deposition process by jets of cooling gas 530 provided by the jet device 500 can achieve refinement of the microstructure of the additively manufactured product.

As shown in FIG. 7, the system can include the jet device 500 connected to wire feed 300, and temperature sensors 550 and 560 separately attached to the wire feed 500, either directly (as in the depiction for an embodiment of temperature sensor 550) or via a bracket 570 (as in the depiction of an embodiment of temperature sensor 560). Although the embodiment of the system depicted in FIG. 7 shows temperature sensor 550 and temperature sensor 560 connected to the wire feed 300, such attachments are illustrative only.

Figure 8:
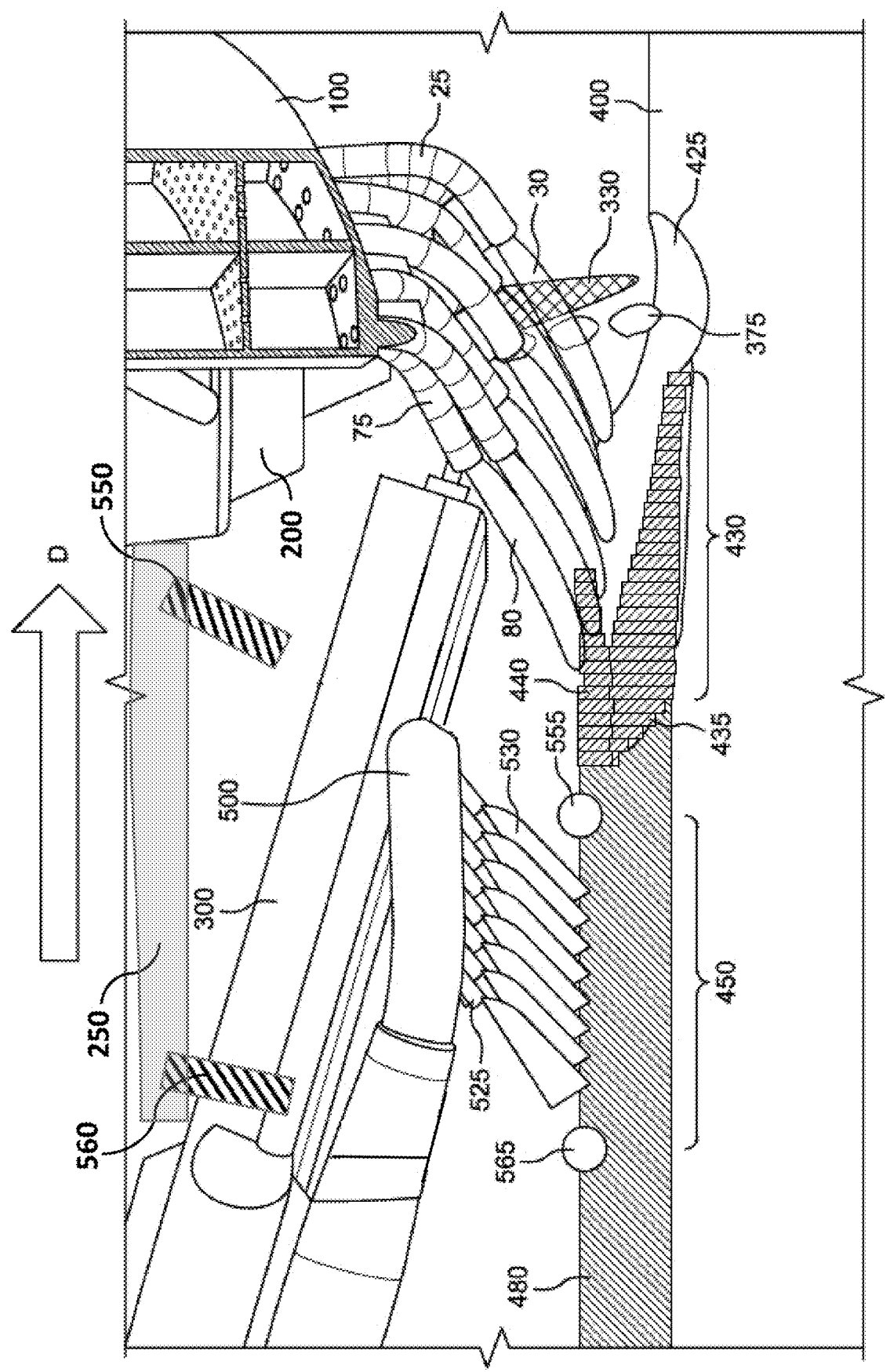
FIG. 8 is schematic side view depiction of an exemplary system that can be used with the methods provided herein. In the embodiment depicted, a single melting tool is used to form molten material that is deposited to form a deposited sting, a first jet device directs cooling gas jets to the melt pool free surface and the boundary between liquid and solid as the molten material is deposited to form the string, and a second jet device directs cooling gas jets to a solidified metal region as the molten material cools, such as an area that can undergo allotropic transformation or precipitation.
Figure 9:
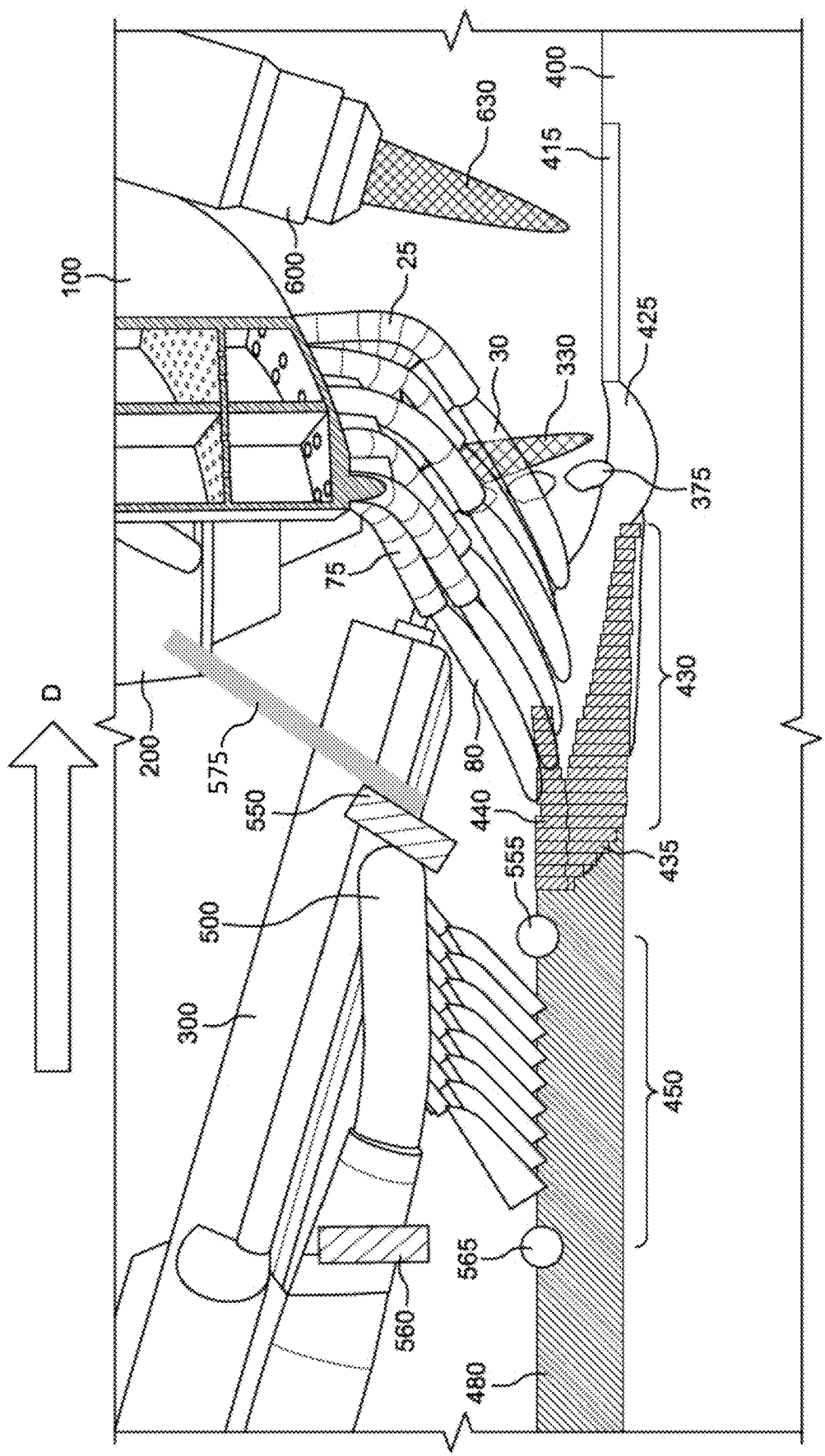
FIG. 9 is schematic side view depiction of an exemplary system that can be used with the methods provided herein employing two melting tools. In the embodiment depicted, one melting tool is used to pre-heat the substrate surface to form a preheated area, and a second melting tool is used to heat and melt a metal onto the preheated area of the base material to form a deposited sting, a first jet device directs cooling gas jets to the melt pool free surface and the boundary between liquid and solid as the molten material is deposited to form the string, and a second jet device directs cooling gas jets to a solidified metal region as the molten material cools, such as an area that can undergo allotropic transformation or precipitation.

As illustrated for example in FIGS. 8 and 9, brackets or mounting arms separately can be used to separately and individually attach each of the cooling jet device 500, temperature sensor 550 and temperature sensor 560 to one or more components of the system that allow application of the cooling gas to the desired surfaces of the workpiece, and appropriate temperature measurement of the workpiece to which in situ cooling gas jets are directed. In some configurations, as illustrated in FIG. 9, temperature sensor 550 can be attached to melting tool 200 either directly or via a bracket 575. In other configurations, as illustrated in FIG. 8, temperature sensor 550 can be attached to a bracket 250. Bracket 250 can be attached to or hold wire feed 300, or it can be attached to or hold melting tool 200, or it can be attached to or hold one or more other components of the system, or any combination thereof.

Similarly, in some configurations, temperature sensor 560 can be attached to wire feed 300 either directly or via bracket 570, or to a bracket that can be the same as or different from bracket 250, but that like bracket 250 can be attached to or hold one or more components of the system. For illustrative purposes, FIG. 8 shows temperature sensor 560 as connected to bracket 250 like temperature sensor 550, where bracket 250, as described earlier, can be attached to or hold wire feed 300, one or more other components of the system, or a combination thereof.

In some configurations, the temperature sensors can include an infrared fiber optic sensor or detector to allow non-contact measurements of the surface of a deposited layer 480 to which cooling gas jets 530 are directed, while allowing the bulk of the temperature sensor to by attached to another component of the system at a location away from the infrared fiber optic sensor or detector. Temperature sensor 550 is positioned to allow a temperature reading to be taken on a workpiece surface in front of the zone of application of the jets of cooling gas. Temperature sensor 560 is position to allow a temperature reading to be taken on a workpiece surface behind the zone of the application of the jets of cooling gas. The positioning of the temperature sensors and jet device can depend on which temperature region of the workpiece is most critical to capture and affect the cooling rate. The positioning can be adjusted based on the metal alloy to be deposited.

A depiction of an exemplary system that includes a first jet device directing a turbulent flow of cooling gas at the liquid-solid boundary of the melt pool and a second jet device that provides forced convective cooling by directing a turbulent flow of cooling gas on the as-solidified material of a deposited layer 480 is depicted in FIG. 8. The depicted system includes a single melting tool 200 that is a main melting tool that produces a main PTA arc 330 that heats and melts a metal wire 350 from a wire feed 300, forming droplets of molten metal 375 that drop into and form a melt pool 425 on the workpiece 400. Without application of the cooling gas via the cooling jet device 100, columnar structures typical of additive manufacture processes can occur as solidifying crystals 435 in the deposited layer 480. For example, in Ti-6Al-4V alloys, solidification is directional and epitaxial with spatial and crystallographic β-grains in a first region or solidification zone 430 dictated by the steep thermal gradient from the heat source/melt pool to the workpiece. As cooling continues, the crystals solidify in a second zone containing solidified material 450, which can be followed by transition where there are changes in the crystallography and morphology of the α-β microstructures upon allotropic transformation. These are directly affected by the prior β-grain structure through orientation relationships, grain boundary nucleation and alignment caused by differences in interfacial energy, diffusion rates and thermal conductivity between the different crystallographic directions in the lattice.

In the system depicted, cooling gas jets 30 from nozzles 25 of jet device 100 are directed at the liquid-solid boundary of the melt pool. Impingement of the gas jets 30 at the liquid-solid boundary of the melt pool 425 induces and accelerates an opposing solidification front 440 at the melt pool surface. Blocking of epitaxy is achieved as consecutive layers nucleate and solidify from the top-layer grains. The forced cooling caused by the gas jets 30 of the jet device 100 is accentuated by concentrated turbulent flow applied by the jet device, across the melt pool, at the melt pool surface, at the liquid-solid boundary of the melt pool, or any combination thereof.

Forced cooling through concentrated turbulent flow can applied on the as-solidified material of the deposited layer 480 to control solid-state phase transformation via extension of the cooling jet device 100, or as depicted, via a second jet device 500 to direct cooling gas jets 525 to the as-solidified material in zone 450 to control solid state phase transitions, such as β-α solid-state phase transformation in titanium alloys, or precipitation reactions in nickel-based superalloys.

As shown in the figure, the system includes a second jet device 500 and at least two temperature sensors to monitor temperature throughout the additive manufacturing process. In the embodiment depicted, a first temperature sensor 550 attached to a bracket 250 can monitor the temperature at the surface of the as-deposited material ahead of the application of a cooling gas, such as in the solidification region 440. A second temperature sensor 560 located after the jet device can be included to measure the temperature of a surface 565 of the workpiece after application of the cooling gas to the string of the workpiece by the second jet device. Temperature monitoring by using the temperature data from the first and second temperature sensors, for example, can allow the user to control the cooling rate by adjusting the flow rate of cooling gas applied using the second jet device 500, or the duration of the flow of the cooling gas towards the workpiece, or both. When two separate cooling jet devices are used, a single cooling gas supply can be used to provide cooling gas to each jet device. Alternatively, each cooling jet device can be attached to a separate cooling gas supply.

The exemplified system is shown using a one torch system, but the methods are not limited to such systems. A two torch system also can be used.

An exemplary two torch system is shown in FIG. 9. In the depicted system, a melting tool 600 preheats a workpiece 400, forming a pre-heated area 415, which makes the workpiece 400 more receptive to molten metal. A second melting tool 200 that is a main melting tool that produces a main PTA arc 330 heats and melts a metal wire 350 from a wire feed 300, forming droplets of molten metal 375 that drop into and form a melt pool 425. Without application of the cooling gas via the jet device 100, columnar structures typical of additive manufacture processes can occur as solidifying crystals 435 in the deposited layer 480. For example, in Ti-6Al-4V alloys, solidification is directional and epitaxial with spatial and crystallographic β-grains in a first region or solidification zone 430 dictated by the steep thermal gradient from the heat source/melt pool to the workpiece. As cooling continues, the crystals solidify in a second zone 450 to form a solidified material.

In the system depicted, cooling gas jets 30 from nozzles 25 of jet device 100 are directed at the liquid-solid boundary of the melt pool. Impingement of the gas jets 30 at the liquid-solid boundary of the melt pool 425 induces and accelerates an opposing solidification front 440 at the melt pool surface. Blocking of epitaxy is achieved as consecutive layers nucleate and solidify from the top-layer grains. The forced cooling caused by the gas jets 30 of the jet device 100 is accentuated by concentrated turbulent flow applied by the jet device, across the melt pool, at the melt pool surface, at the liquid-solid boundary of the melt pool, or any combination thereof.

Forced cooling through concentrated turbulent flow can applied on the as-solidified material to control solid-state phase transformation via a second jet device 500 to direct cooling gas jets 525 to the as-solidified material in zone 450 to control solid state phase transitions, such as β-α solid-state phase transformation in titanium alloys, or precipitation reactions in nickel-based superalloys.

As shown in the figure, the system includes a second jet device 500 and at least two temperature sensors to monitor temperature throughout the additive manufacturing process. In the embodiment depicted, a first temperature sensor 550 can monitor the temperature at the surface of the as-deposited material ahead of the application of a cooling gas, such as in a post-solidification temperature monitoring area 555. A second temperature sensor located after the jet device can be included to measure the temperature of a surface 565 of the workpiece after application of the cooling gas to the string of the workpiece by the second jet device 500, such as at a post transformation temperature monitoring area 565. Temperature monitoring by using the temperature data from the first and second temperature sensors, for example, can allow the user to control the cooling rate by adjusting the flow rate of cooling gas applied using the second jet device 500, or the duration of the flow of the cooling gas towards the workpiece, or both.

D. METHODS

Also provided herein are methods for manufacturing a three-dimensional object of a metallic material by additive manufacture, where the object is made by fusing together successive deposits of the metallic material onto a base material, the methods including using a first heating device to preheat at least a portion of the surface of the base material, e.g., at the position at which the metallic material is to be deposited; using a second heating device to heat and melt a metallic material such that molten metallic material is deposited onto the preheated area of the base material; using a jet device provided herein to direct a cooling gas across the liquid molten pool, or to impinge on the liquid molten pool, or to impinge upon a solidified material adjacent to a liquid-solid boundary of the liquid molten pool, or any combination thereof; and moving the base material relative to the position of the first and second heating devices and the jet device in a predetermined pattern such that the successive deposits of molten metallic material solidifies and forms the three-dimensional object.

In one method, a jet device provided herein directs a cooling gas having a turbulent flow across the melt pool, at the melt pool surface, at the liquid-solid boundary of the melt pool, or any combination thereof. In another method, a jet device provided herein directs a cooling gas having a turbulent flow to an as-solidified material, such as in a solid state transformation zone, e.g., an allotropic transformation area or an area in which precipitation reactions could occur. In another method, a first jet device provided herein directs a cooling gas having a turbulent flow across the melt pool, at the melt pool surface, at the liquid-solid boundary of the melt pool, or any combination thereof, and a second jet device provided herein directs a cooling gas having a turbulent flow to an as-solidified material, such as in a solid state transformation zone.

In the methods provided herein, the cooling gas can comprise an inert gas, such as argon, helium, neon, xenon, krypton and combinations thereof. The cooling gas can be a non-inert gas. The cooling gas can be a mixture of different elemental gases. The cooling gas directed across the melt pool, at the melt pool surface, at the liquid-solid boundary of the melt pool, or any combination thereof can have a flow rate from about 1 L/min to about 200 L/min. The cooling gas directed as an as-solidified material can have a flow rate from about 0.01 L/min to about 300 L/min. The cooling gas can be applied in a constant stream, or can be applied intermittently, or can be applied in a pulsed flow.

The temperature of the cooling gas applied can be any temperature. The cooling gas temperature can be the ambient temperature of the additive formation process. Typically, the cooling gas temperature can be about room temperature or less, such as about 25° C. or less. The temperature of the gas can be any temperature that cools the surface with which it interacts. The temperature can be less than 100° C., or less than 50° C., or less than 30° C., or less than 25° C., or less than 10° C., or less than 5° C., or less than 0° C. Gas at a cryogenic temperature also can be used. For example, the temperature of the cooling gas delivered to the inlet of the jet device can be from at or about −195° C. to at or about 25° C.

In the methods provided herein, a jet device having at least two temperature sensors is used to measure and to produce a targeted cooling rate. The positioning of the temperature sensors and the jet device can depend on the temperature region identified as critical to capture and affect the cooling rate. The positioning can be adjusted based on the metal alloy to be deposited. The temperature sensors can include IR thermometers to capture the temperature of a surface of the deposited string material of a workpiece before and after application of the turbulent jets of cooling gas. Based on the data, the flow rate or duration or both of the cooling gas can be adjusted to increase or decrease the cooling rate. In some methods, the temperature data is captured and used to provide in-process feedback control to allow partial or full automation of the cooling rate used in the additive manufacturing process. The data also can be captured and used to design post-process an iterative deposit development program/schedule to automate a deposition of a workpiece.

The desired cooling rate can be alloy dependent. Different alloys can exhibit different changes in solid state phase transformation depending on the temperature range and time exposed to a specific temperature range. For example, for many titanium alloys, the methods provided herein have a targeted cooling temperature in the range from 1200° C. to about 600° C., or from 1050° to about 800° C. to promote allotropic transformations. For steel alloys, a targeted cooling temperature can be in the range from 1000° C. to about 300° C., or from about 800°–400° C. to promote desired solid state transformations. For example for the alloy Ti-6Al-4V, the cooling effect from the gas jet device directed at as-solidified material in this temperature region can be used to enhance cooling rates from something that typically gives undesired colony/lamellar structures to conditions that promote beneficial fine basketweave-type structures. Per temperature measurements during testing, this corresponds to increasing bulk cooling rate in the phase transformation region from around 10° C./s to 15° C./s. Due to localized gas jet impingement, the temperature captured on the workpiece surface in those cases was between 80 and 140° C./s. The relationship between measured surface cooling rate and experienced bulk cooling rate needs to be established for the alloy in question. The top of the deposited string undergoes elevated cooling rates, but will be reheated back to above the transformation temperature during consecutive layers and it is therefore only segments towards the bottom of the heat affected zone for each layer that will remain in the finished deposit. Steels with key temperature range for transformation typically during cooling between 800-400° C.

In the methods provided herein, suitable local cooling for a period determined by the temperature readings from the temperature sensors measuring a surface temperature of the deposited string can be used to dissipate any higher local energy input that can be necessary to form junctions or transitions in the workpiece. The methods allow for continuous cooling rate control during material addition, and can be used to provide local preconditioning between string depositions. In the methods provided herein, flow rates of the cooling gas can be adjusted based on changing thermal conditions in the workpiece during processing. The flow of turbulent cooling gas can be increased as residual heat has built up during additive manufacturing, or to dissipate heat added in order to form a particular structure, such as a junction or a transition.

In the methods provided herein, turbulent flow from the nozzles of the jet device typically can be achieved through a high velocity of the cooling gas through the nozzles. Other techniques also can be used to produce turbulent cooling gas flow. For example, some of the nozzles of the jet device can be positioned so that the jets of cooling gas from at least two nozzles impinge on each other, creating turbulent flow of the cooling gas in the vicinity of the molten pool. The nozzles can include a protrusion or an indentation or a combination thereof in the orifice of the nozzle or within the body of the nozzle to interfere with laminar flow to promote turbulent flow. Typically, the velocity of the cooling gas flowing through the nozzle is selected so that the cooling gas exiting the nozzles exhibits turbulent flow instead of laminar flow.

The number of nozzles and their configuration can be selected to deliver cooling gas that covers a targeted length of the workpiece, e.g., from about 5 mm to about 50 mm, or from about 10 mm to about 40 mm, or from about 15 to about 30 mm, along the direction of travel.

Typical process conditions traditionally used in additive manufacturing usually result in directional solidification and growth of columnar crystals due to the presence of steep thermal gradients, but this can be dependent on the alloy utilized. For example, for Ti-6Al-4V alloy, solidification is directional and epitaxial with spatial and crystallographic orientation of β-grains dictated by process characteristics that include a steep thermal gradient from heat source/melt pool to workpiece. Crystallography and morphology of α-β microstuctures in Ti-6Al-4V alloy upon allotropic transformation are directly affected by the prior β-grain structure through orientation relationships, grain boundary nucleation and alignment caused by difference in interfacial energy, diffusion rates and thermal conductivity between different crystallographic directions in the lattice. This macro-micro interaction leads to long ranging limitations of crystallographic and morphological local diversity within prior β-grains, and thus pronounced differences in strain response across β-grain boundaries.

The methods provided herein allow for a reduction in the size of the melt pool length. This can be achieved by the increased solidification rate at the trailing edge of the melt pool. Application of turbulent cooling gas toward the melt pool increases solidification and reduces the time for solidification to occur. Depending on the solidification rate achieved by application of the cooling gas using the jet device provided herein the total melt pool length can be reduced by about 10% to about 50%. For example, compared to conventional additive manufacturing methods and systems, melt pool length can be 90% or less, or 80% or less, or 70% or less, or 60% or less, or 50% or less of the melt pool length in conventional additive manufacturing techniques.

The jet devices provided herein induce the grain refinement. Controlling process parameters can aid the effectiveness. This is especially true in alloys that are resistant to solidification refinement, such as Ti-6Al-4V due to the narrow freezing range exhibited in that alloy. The solidification characteristics make constitutional undercooling unlikely at the typical thermal gradients and solidification rates of metal additive manufacturing.

The jet devices provided herein can be used in configurations of metal additive manufacturing using a single melting device or one torch configuration. The jet devices provided herein can be used in two torch configurations of metal additive manufacturing. A preheater torch can be used to achieve a dedicated workpiece surface temperature control. A separate second torch can be used as a melter torch to melt the feedstock, such as a metal wire. Thermal gradients can by modulated by limiting the energy intensity required in the melter torch and to achieve desired contact angles of the molten metal by ensuring wetting at the perimeter of the melt pool without excessively superheating the melt pool itself. This is beneficial for grain refinement, but not required to achieve the effect achieved by using the jet device.

Dedicated energy transfer to wire, also with resistive heating of the wire allows high deposition rates without excessive energy transfer directly to the melt pool as would be the case if the energy source that melts the wire is also transferred to the melt pool. Such an arrangement can limit melt pool superheating and therefore reduce thermal gradients. It also allows for deposition rates that are sufficient to sustain an extended melt pool length and allow for the interaction of gas jets from the jet device on the melt pool surface or in the vicinity of the melt pool. While these reductions in thermal gradients can be beneficial for grain refinement, reductions in thermal gradients are not required to achieve the effect of grain refinement realized by application of the cooling gas using the jet devices provided herein.

Additional aspects of melt pool control and string shape control is evident from testing of the jet device testing. As discussed above, the methods provided herein allow for a reduction in the size of the melt pool length, which can be achieved by the increased solidification rate at the trailing edge of the melt pool. The methods provide the ability to shape strings for wider single row walls, and to eliminate need for filling in at the end of string by melt displacement from gas jet pressure towards end. The methods provided herein allow refinement of solidification structures in workpieces made by additive manufacturing processes. The methods can eliminate or significantly reduce the coarse columnar structure typically produced by conventional additive manufacturing systems. Elimination of these coarse columnar structures can result in a manufactured product that exhibits higher strength, ductility and fatigue resistance than achieved in conventional additive manufacturing processes.

Figure 4A:
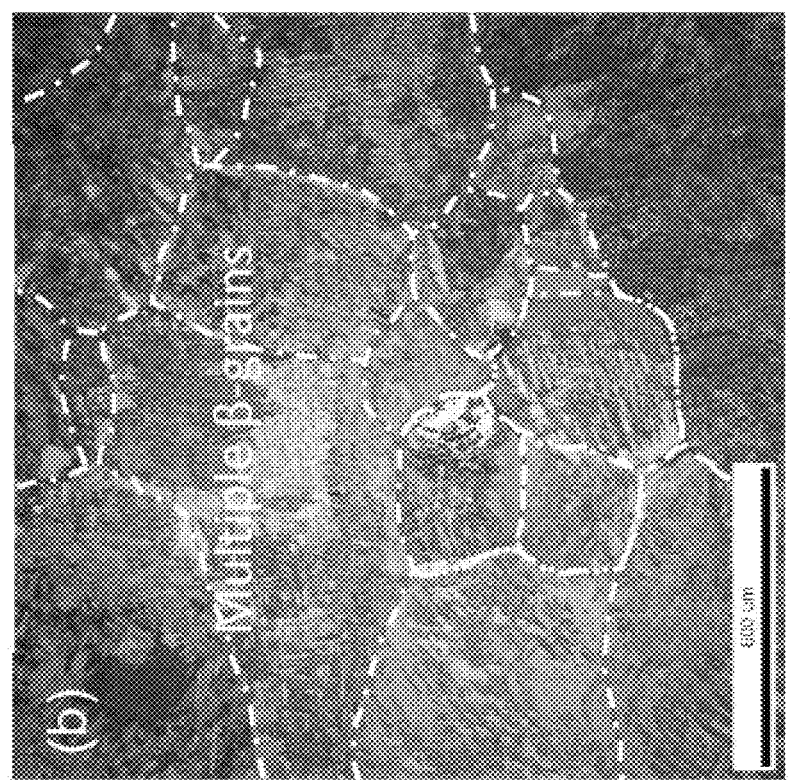
FIGS. 4A and 4B show electron back scatter diffraction (EBSD) photographs of the crystallography of typical material made by conventional additive manufacturing processes (FIG. 4A) versus that achieved using the methods provided herein, where gas jet impingement results in a material having a more refined grain (FIG. 4B).
Figure 4B:
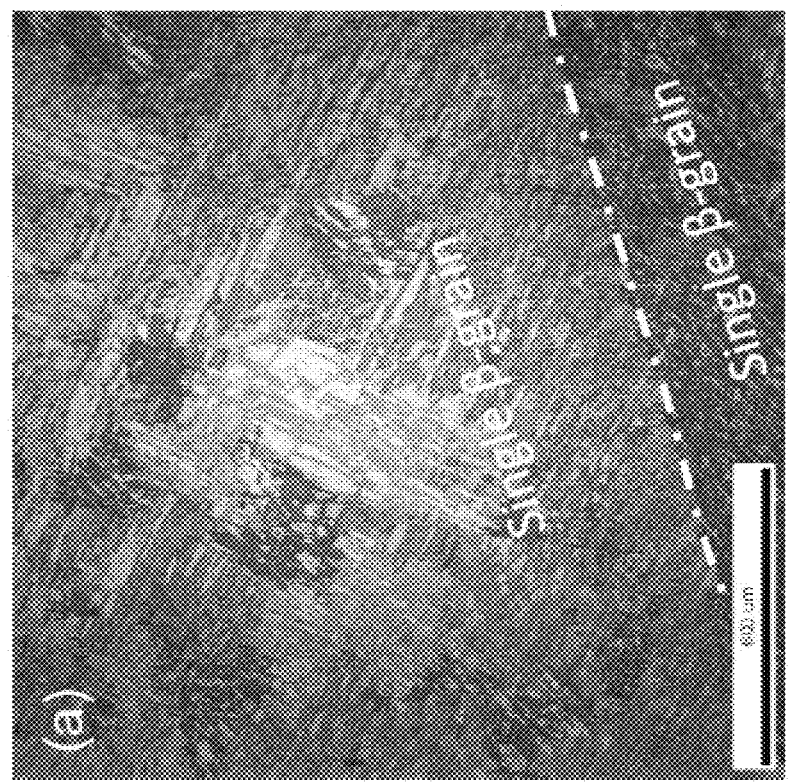

Electron back scatter diffraction (EBSD) allows analysis of crystal structures, including grain size and boundary types, mis-orientations, deformations, phase discrimination and distribution, crystallographic orientations and texture measurements (micro- and macro-crystallographic texture). For deposited layers, EBSD can be used to look at epitaxy between layers as well as crystal orientation. The elongated columnar structures typical of conventional additive manufacturing processes impose a restriction on the number of favorable α-grain variations that can occur in a Ti-6Al-4V sample. This can be seen in FIGS. 4A and 4B, which shows EBSD characterization of the crystallography of typical material made by conventional additive manufacturing processes (FIG. 4A) versus that achieved using the methods provided herein, where gas jet impingement results in a material having a more refined grain (FIG. 4B). As can be seen in FIG. 4A, long range alignment and uniformity of lamellar structures along prior β-grain boundaries are exhibited in the typical coarse grained material from conventional processes. In material produced using the jet device and methods provided herein, crystallographic diversity is increased, the material exhibiting a multitude of initial β-grain orientations. As can be seen in FIG. 4B, the extent of grain boundary alignment is reduced in the grain refined material produced using the jet device and methods provided herein.

Also provided are methods of minimizing or eliminating coarse columnar solidification structures in an additively manufactured metal product. The methods include application of a turbulent cooling gas jet using a jet device provided herein on a free surface of a melt pool. The directed cooling gas jets at the melt pool, such as at the liquid-solid boundary of the melt pool, induces or accelerates or both the growth of an opposing solidification front at the free melt pool surface. This can result in blocking of epitaxy, as consecutive layers nucleate and solidify from the top-layer grains, and thereby minimizing or eliminating coarse columnar solidification structure formation. Nucleation at the melt pool free surface can result in the break-up of columnar solidification structures by finer grains at irregular intervals, which can lead to improved, repeated material properties achieved during the additive manufacturing process. The methods can result in increased crystallographic diversity, such as the formation of a multitude of initial β-grain orientations. The method also can reduce the extent of grain boundary alignment. The methods also can result in reduced strain segmentation of the additively manufactured metal product. The method can result in a finished material exhibiting increased strain hardening, especially when loaded parallel to build direction relative to typical material not produced using the methods provided herein that include gas jet impingement using the jet devices as described. Additively manufactured products produced using the method also can exhibit an increase in ductility in the direction of production (along strings).

Also provided are methods of refining the microstructure of additively manufactured metal products. The methods include using a cooling jet device provided herein to increase cooling rate by applying jets of cooling gas in situ to an as-deposited solidified material. Forced cooling of as-deposited material during the deposition process can achieve refinement of the microstructure of the additively manufactured product. Cooling rate can significantly effect microstructures formed during the manufacturing process. In some methods, application of the turbulent cooling gas at the as-solidified deposited material in situ can modulate or control allotropic transformation. In methods in which the deposited material is a titanium alloy, such as Ti-6Al-4V, forced cooling through application of turbulently flowing cooling gas on the as-solidified deposited material in situ can control β-α solid-state phase transformation. The methods of grain refinement provided herein can counter long range strain mismatch at boundaries caused by duality of microstructures by yielding a more homogeneous and finely distributed presence of different microstructural elements.

Figure 10A:
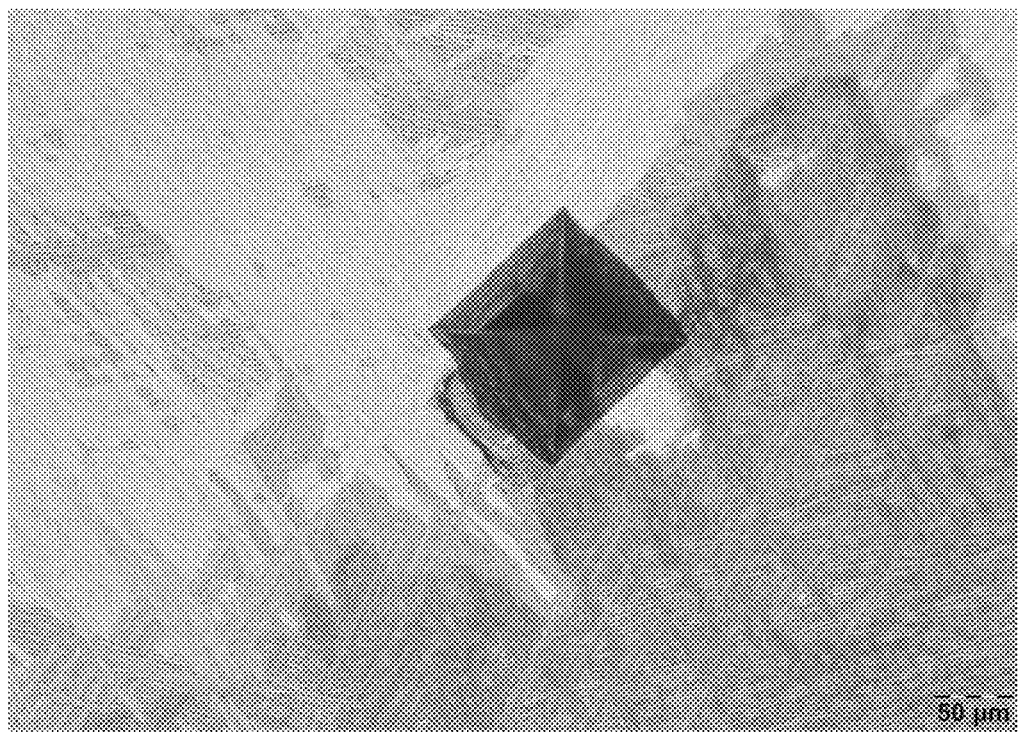
FIGS. 10A and 10B are photomicrographs showing the correlation between differences in bulk cooling rate and microstructure in Ti-6AlO4V material.
Figure 10B:
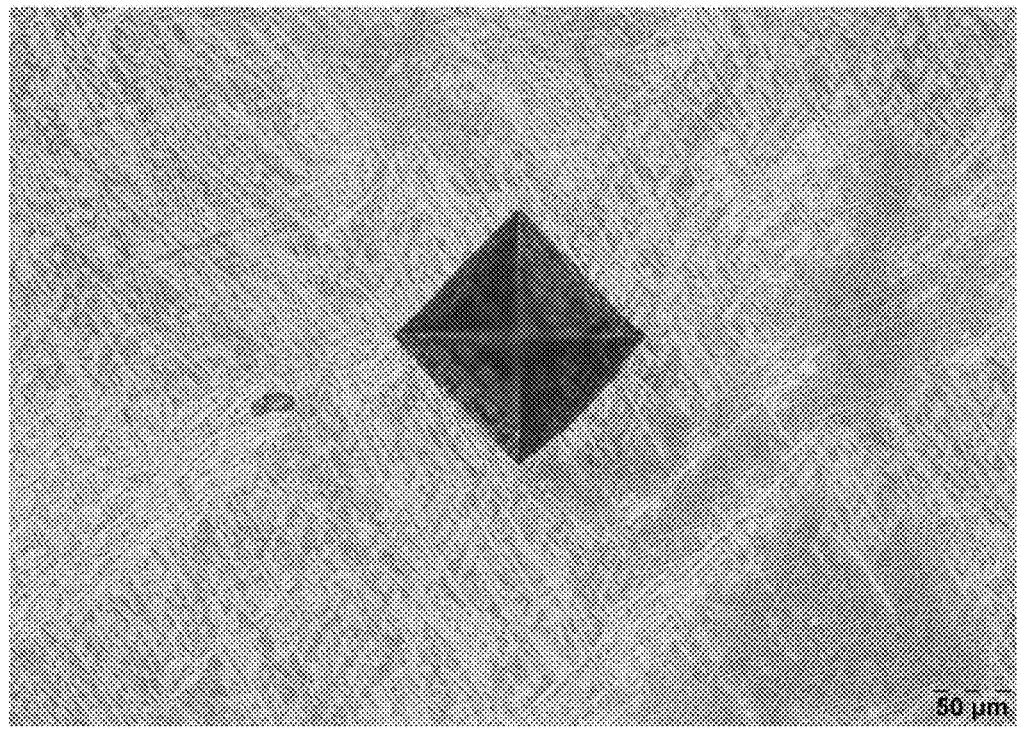

Cooling rate effect on microstructure can be observed in FIGS. 10A and 10B. A plasma and wire-based high deposition rate additive manufacturing process utilizing the Ti-6Al-4V alloy was used to form a product. Cooling at a faster cooling rate was found to significantly refine microstructure of the deposited product. A much finer basketweave-type microstructure was achieved when the temperature of the deposited material was decreased from 1000°

C. to 900° C. at a measured bulk cooling rate 15° C./sec (FIG. 10B) than when cooled at a measured bulk cooling rate 15° C./sec (FIG. 10A). When tested for hardness, a hardness indent (the dark pyramid-shaped indentation in the center of the figures) illustrates increased uniformity of plastic deformation in the refined basketweave-type microstructure (FIG. 10B) compared to the less refined basketweave-type microstructure (FIG. 10). As can be seen in FIG. 10A, there is a localized concentration of plastic deformation near the indent. FIG. 10B does not exhibit any localized concentration of plastic deformation. Thus, the application of cooling gas jets to force cool the as-deposited material during deposition can achieve a finer basketweave-type microstructure, as well as improve allotropic phase transformations (transformation from one crystal structure to another), precipitation and other solid state thermochemical reactions.

Also provided are methods of force cooling an additively manufactured metal object in situ. The methods include applying jets of cooling gas in situ to an as-deposited solidified material to increase the cooling rate of the material. The cooling gas jets are applied by the jet devices in a turbulent flow, and can achieve a bulk cooling rate from about 10° C./s to about 25° C./s, or a recorded cooling rate of from about 80° C./s to 150° C./s measured at the surface to which the cooling gas is directed.

Also provided are methods of increasing uniformity of plastic deformation in an additively manufactured titanium alloy, such as a Ti-6Al-4V metal object in situ. The methods include applying jets of cooling gas in situ to an as-deposited solidified material to increase the cooling rate of the material and thereby promote the formation of a finer basketweave-type microstructure instead of the colony/lamellar microstructure typically produced. The cooling gas jets are applied by the jet devices in a turbulent flow. Finer basketweave-type microstructures can be achieved as the cooling rate is increased, and the finer basketweave-type microstructures increase uniformity of plastic deformation. For example, increasing the bulk cooling rate from about 10° C./s to about 15° C./s when cooling the object from 1000° C. to 900° C. can result in a finer basketweave-type microstructure and increased uniformity of plastic deformation.

The methods provided herein can be performed in any additive manufacturing system. The methods can be performed in a system that includes a closed chamber filled with an inert gas to provide an inert atmosphere where the whole process is performed in an inert atmosphere. The inert atmosphere can be or contain argon, xenon, neon, krypton, helium or combinations thereof, allowing inert atmosphere deposition.

E. EXAMPLES

The following examples are included for illustrative purposes only and are not intended to limit the scope of the embodiments provided herein.

Example 1

A plasma and wire-based high deposition rate additive manufacturing process utilizing the Ti-6Al-4V alloy was used without (A) and with (B) the jet device provided herein jetting cooling gas during additive manufacturing. The cooling gas used was room temperature argon gas. The flow rate of the cooling gas was 20 L/min applied using the type of jet device illustrated in FIG. 1. Deposition rate was 5 kg/h and workpiece surface temperature/interpass temperature was 650° C. The deposition rate and the temperature were the same whether or not the jet device was used to applying cooling gas.

Micrographs of the results are shown in FIGS. 5A and 5B. FIG. 5A shows the structure of a metal object produced by typical additive manufacturing. The grain structure in the manufactured product in FIG. 5A is coarse and columnar structures are visible. FIG. 5B shows the beneficial results achieved when the jet device is used to apply a cooling gas to the melt pool during additive manufacturing as described herein. The grain structure in the manufactured product in FIG. 5B is approximately equiaxed and exhibits a refined structure. Accordingly using the jet device provided herein to apply a cooling gas during additive manufacture results in a product have a refined grain structure. Manufactured products having these refined grain structures demonstrate increased strength, fatigue resistance, and durability.

Example 2

A plasma and wire based high deposition rate additive manufacturing process utilizing the Ti-6Al-4V alloy was used with unilateral application of cooling gas to one side of a melt pool in a single row Ti-6Al-4V string deposit using the jet device provided herein. The cooling gas used was room temperature argon gas. The flow rate of the cooling gas was 25 L/min applied using the type of jet device illustrated in FIG. 1. Deposition rate was 5 kg/h and deposition interpass temperature was 500° C. The argon cooling gas was applied to one half of the melt pool, and the other half was untreated. This was achieved by engaging the nozzles of the jet device on only one side of the melting tool.

Figure 6:
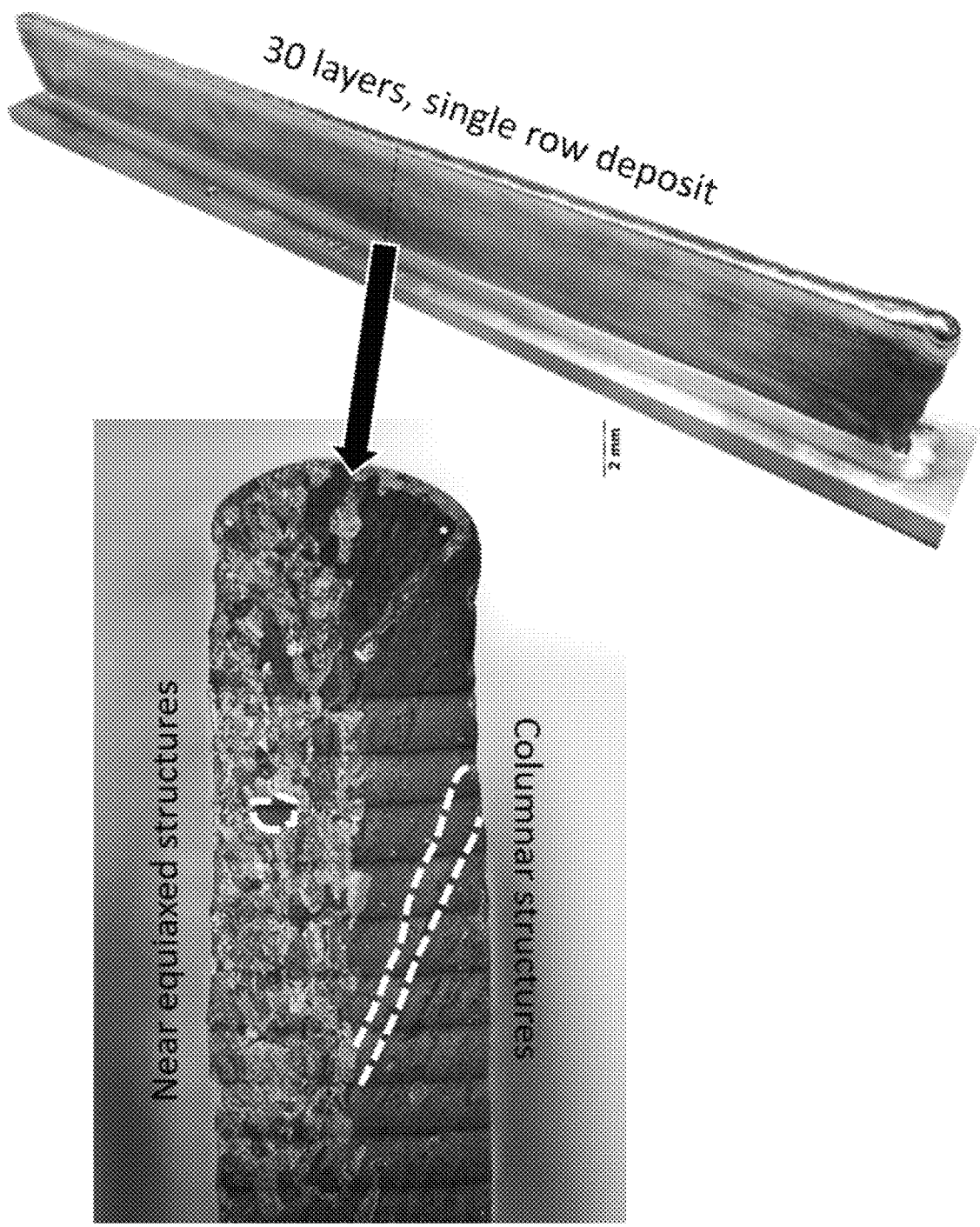
FIG. 6 is a photograph showing the result of application of gas jet impingement on one half of the melt pool in a single row Ti-6Al-4V deposit using the jet device provided herein. Dotted lines outline typical grain size and shape on either side of the wall.

The results are shown in FIG. 6. As can be seen in the figure, the untreated side (the right portion in the figure) exhibited coarse grain structure and columnar structures. The grain structure on the treated side the manufactured product in FIG. 6 (the left side) has metal grains that are approximately equiaxed and have a refined structure. The dotted lines in the figure outline typical grain size and shape on either side of the product. The grain size of the treated size is significantly smaller (maximum grain dimension <2 mm and average grain size <1 $mm^2$) compared to that achieved in traditional additive manufacturing methods, as shown on the right. The untreated side (left) shows a slight tilt of the columnar structure, attributed to the effect the impinging cooling gas has on the thermal gradient. The micrograph also illustrates that manipulation of the nozzles of the jet device can allow the production of graded microstructures and tailoring of local material properties using the jet device provided herein in additive manufacturing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.
10 First conduit
15 First conduit inlet
20 Diffuser
25 Nozzle
30 Gas jet 40 Cooling gas supply
50 Cooling gas supply
60 Second conduit
65 Second conduit inlet
70 Diffuser
75 Nozzle
80 Gas jet
85 Cross-piece
90 Melt pool
95 Deposited string
100 Jet device
200 Melting tool
250 Bracket
300 Wire feed
330 Melting arc or beam
350 Metal Wire
375 Molten metal droplets
400 Workpiece
415 Pre-heated area
425 Melt pool
430 Solidification zone
435 Solidifying crystals
440 Opposing solidification induced by cool gas jet impingement
450 Solidified material zone
480 Deposited layer
500 Second jet device
525 Nozzle
530 Cooling gas jet
550 Temperature sensor
555 Post solidification temperature monitoring area
560 Temperature sensor
565 Post transformation temperature monitoring area
570 Bracket
575 Bracket
600 Melting tool
630 Melting arc or beam
D Direction of travel

What is claimed is:

1. A jet device, comprising:
a first conduit comprising:
a first inlet for accepting a cooling gas; and
a first aperture connected to a first nozzle for dispensing the cooling gas; and
a second conduit comprising:
a second inlet for accepting the cooling gas; and
a second aperture connected to a second nozzle for dispensing the cooling gas;
wherein:
the first conduit is attached to a melting tool on a first side of a thermal energy source produced by the melting tool and the second conduit is attached to the melting tool on an opposite, second side of the thermal energy source;
at least one of the first nozzle or second nozzle is configured to produce a turbulent flow of the cooling gas as the cooling gas is dispensed during material deposition;
the first nozzle and second nozzle are configured to direct the cooling gas to impinge on one or more of a molten pool and a liquid-solid boundary of the molten pool; and
the first nozzle and second nozzle are positioned to prevent blowing the cooling gas toward the thermal energy source.

2. The jet device of claim 1, wherein any one or more of the first and second conduits comprises:
a plurality of nozzles; and
a plurality of channels, pipes, tubes or lines within each conduit, each one of the channels, pipes, tubes or lines separately attached to a single nozzle of the plurality of nozzles.

* * * * *